United States Patent
Szeto

(10) Patent No.: US 10,236,649 B2
(45) Date of Patent: Mar. 19, 2019

(54) ADAPTORS FOR ADAPTING AN ELECTRONIC DEVICE TO A MODULAR ELECTRONIC DEVICE SYSTEM

(71) Applicant: NANOPORT TECHNOLOGY INC., Markham (CA)

(72) Inventor: Timothy Jing Yin Szeto, Mississauga (CA)

(73) Assignee: NANOPORT TECHNOLOGY INC., Markham (CA)

( * ) Notice: Subject to any disclaimer, the term of this patent is extended or adjusted under 35 U.S.C. 154(b) by 0 days.

(21) Appl. No.: 16/063,057

(22) PCT Filed: Dec. 15, 2016

(86) PCT No.: PCT/CA2016/051483
§ 371 (c)(1),
(2) Date: Jun. 15, 2018

(87) PCT Pub. No.: WO2017/100928
PCT Pub. Date: Jun. 22, 2017

(65) Prior Publication Data
US 2018/0366893 A1 Dec. 20, 2018

(51) Int. Cl.
*G06F 1/16* (2006.01)
*H01R 31/06* (2006.01)
(Continued)

(52) U.S. Cl.
CPC ....... *H01R 31/065* (2013.01); *H01R 13/6205* (2013.01); *H01R 24/60* (2013.01);
(Continued)

(58) Field of Classification Search
CPC ... H05K 5/0065; G06F 1/1632; G06F 1/1633; G06F 1/1684
See application file for complete search history.

(56) References Cited

U.S. PATENT DOCUMENTS 6,732,218 B2    5/2004   Overtoom et al.
7,480,753 B2 *  1/2009   Bohm ................. G06F 13/4022
                                                        710/104
(Continued)

FOREIGN PATENT DOCUMENTS

WO    2015/070321 A1    5/2015

OTHER PUBLICATIONS

Smart Enclosure Systems, Home Page of Smart Enclosure Systems website, http://www.scesys.com/, retrieved from Internet on Nov. 23, 2015.

*Primary Examiner* — Anthony Q Edwards
(74) *Attorney, Agent, or Firm* — Norton Rose Fulbright Canada LLP; Alexandre Daoust; Reno Lessard

(57) ABSTRACT

There is provided an adapter for adapting an electronic device to a modular electronic device system. The adapter generally has a housing having two lateral edges, a cavity between the lateral edges and being adapted to receive the electronic device, each of the two lateral edges of the housing having at least one magnetic coupler electrically connectable with at least one magnetic coupler of the modular electronic device system by magnetically engaging the at least one magnetic coupler of the adapter with the at least one magnetic coupler of the modular electronic device system, and an internal electric conductor network electrically connected to the magnetic couplers of the adapter and electrically connected to an internal connector which is electrically connectable to the electronic device when received in the cavity of the housing.

12 Claims, 18 Drawing Sheets

(51) Int. Cl.
  *H01R 24/60*   (2011.01)
  *H01R 13/62*   (2006.01)
  *H04M 1/725*   (2006.01)
  *H01R 107/00*   (2006.01)

(52) U.S. Cl.
  CPC ....... *H04M 1/72527* (2013.01); *G06F 1/1613* (2013.01); *H01R 2107/00* (2013.01); *H01R 2201/06* (2013.01)

(56) References Cited

U.S. PATENT DOCUMENTS

| | | | |
|---|---|---|---|
| 8,187,006 B2 | 5/2012 | Rudisill et al. | |
| 8,447,890 B1 | 5/2013 | LeTourneur et al. | |
| 8,565,843 B1 * | 10/2013 | Lugo | H04M 1/04 455/556.1 |
| 9,363,904 B1 * | 6/2016 | Szeto | H01R 13/6205 |
| 2014/0059264 A1 * | 2/2014 | Sudak | H02G 3/02 710/303 |
| 2016/0306384 A1 * | 10/2016 | Carvey | G06F 1/1632 |

* cited by examiner

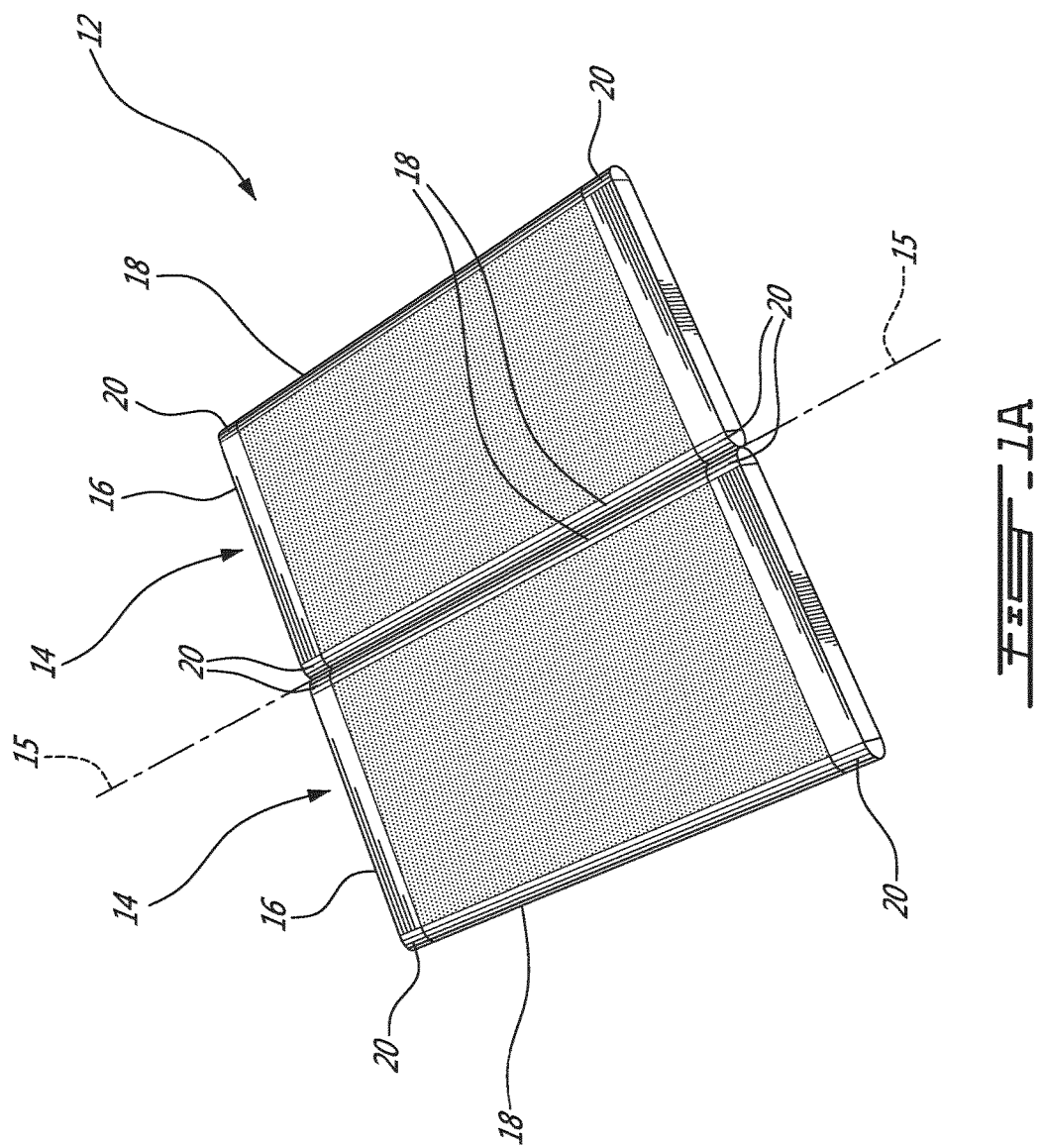

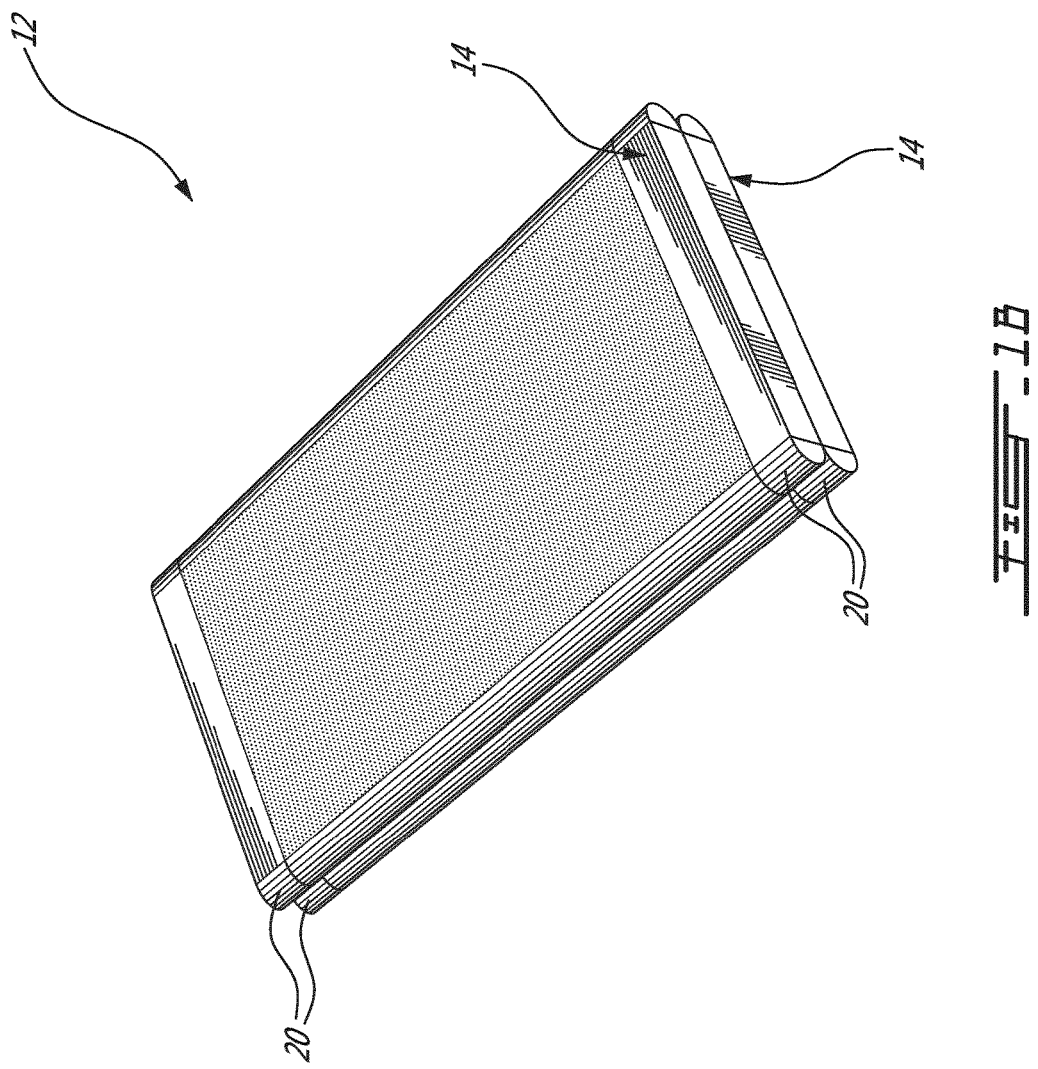

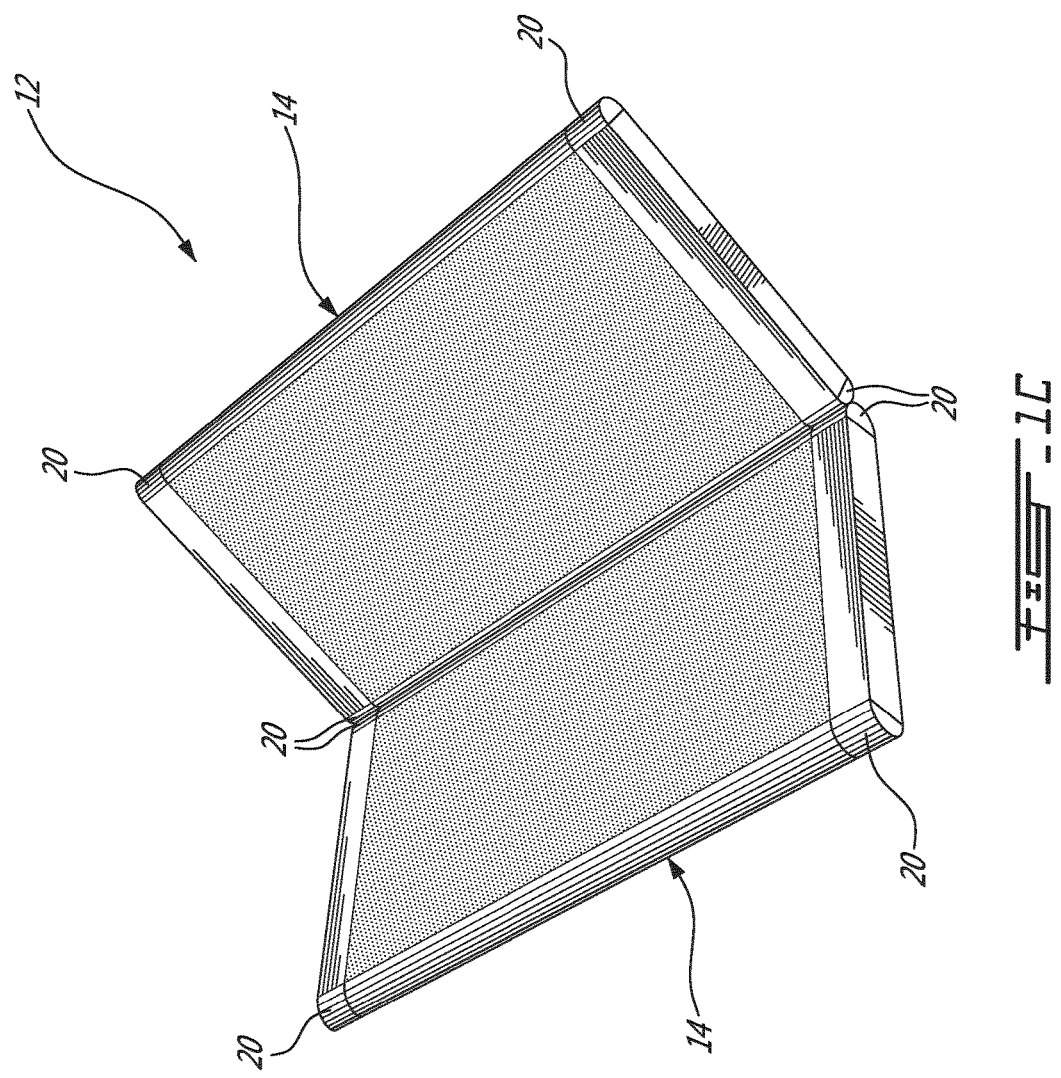

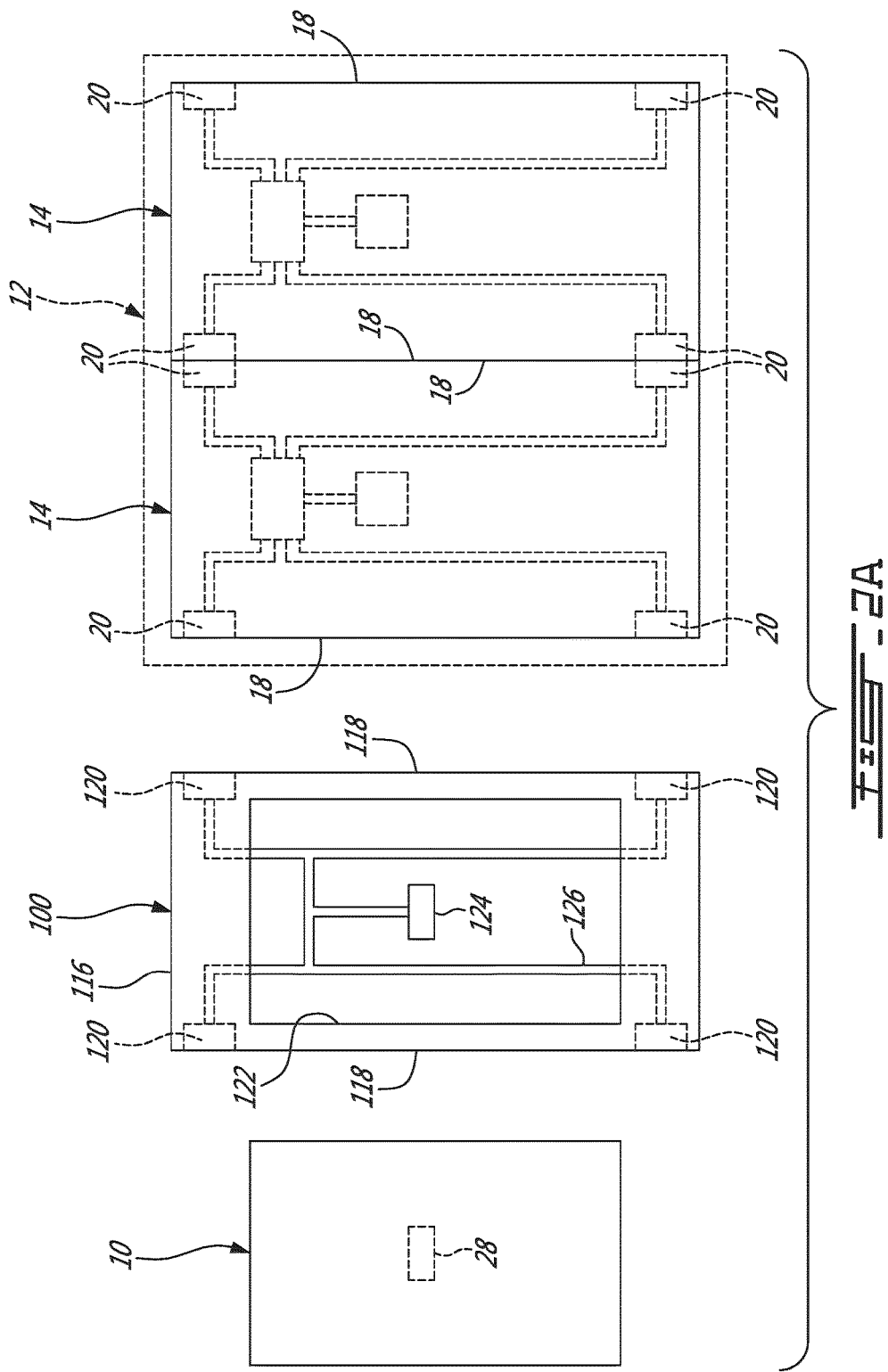

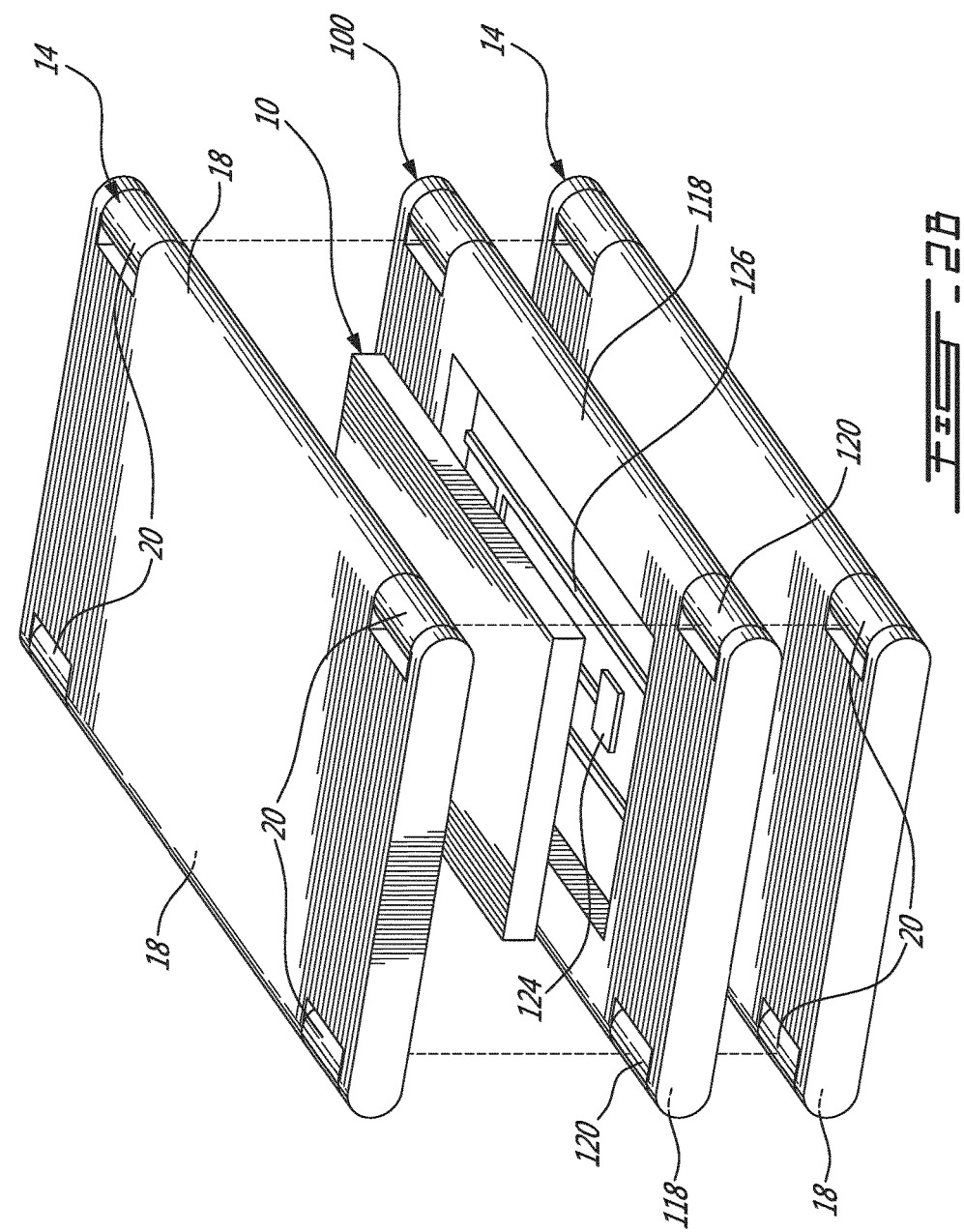

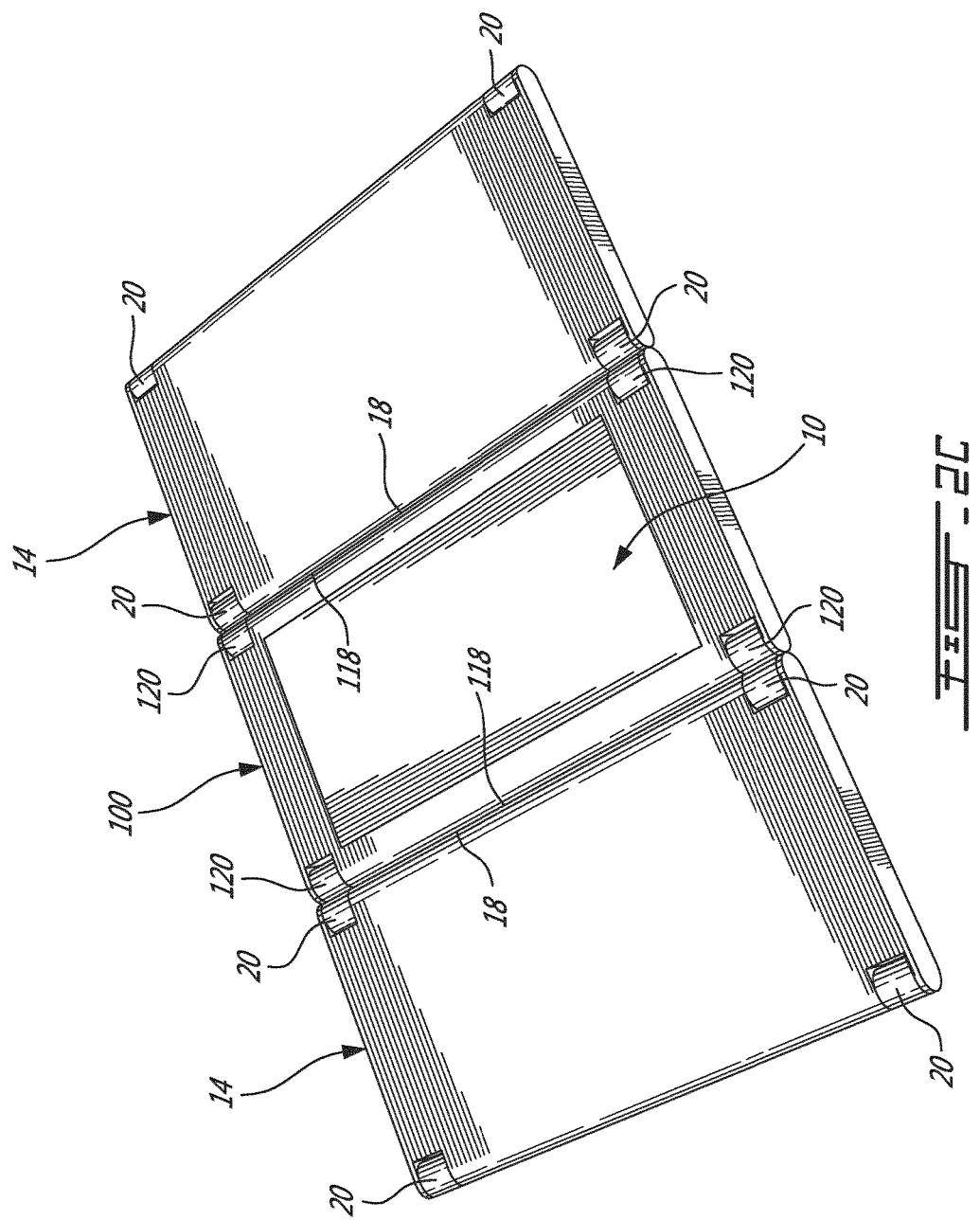

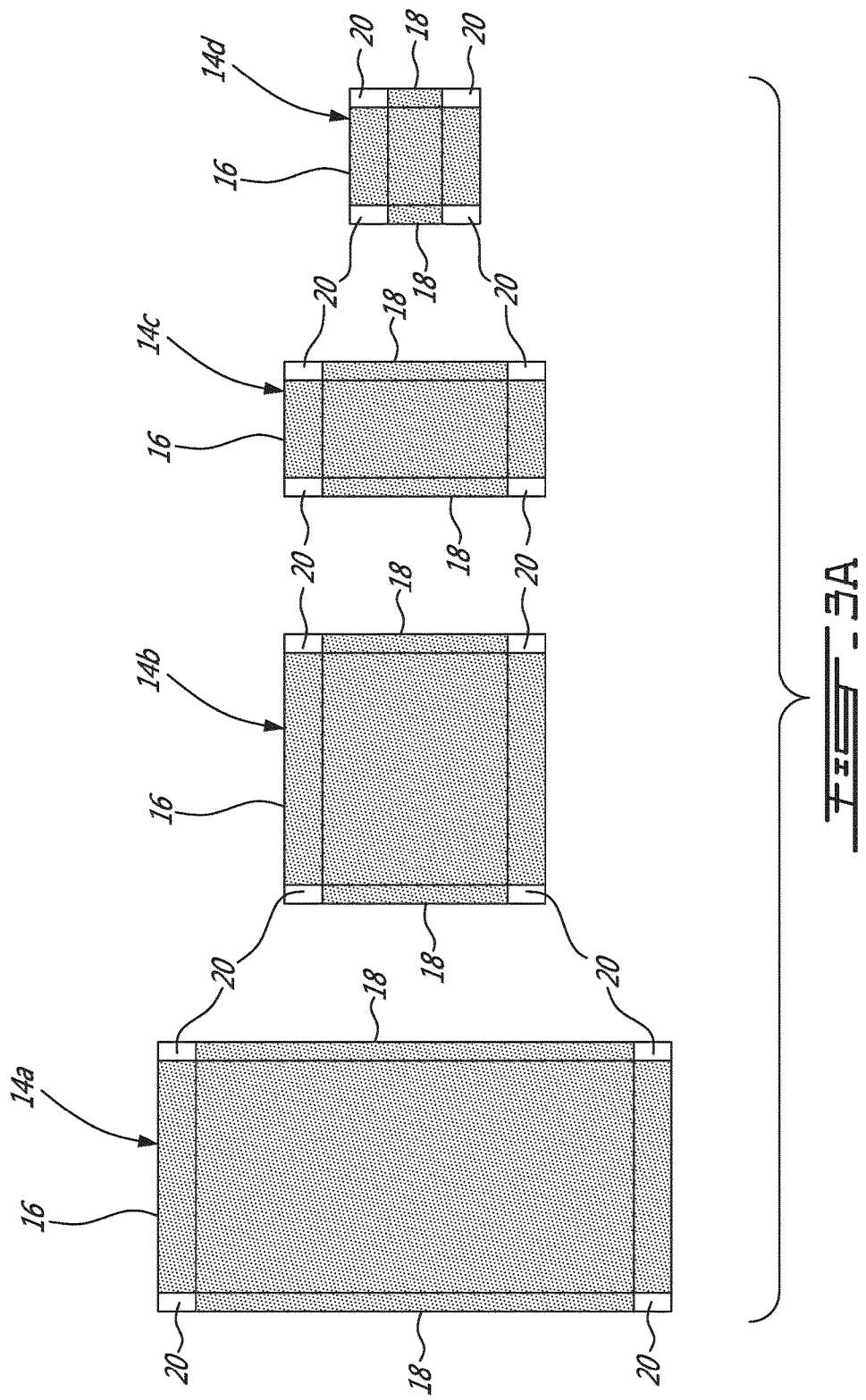

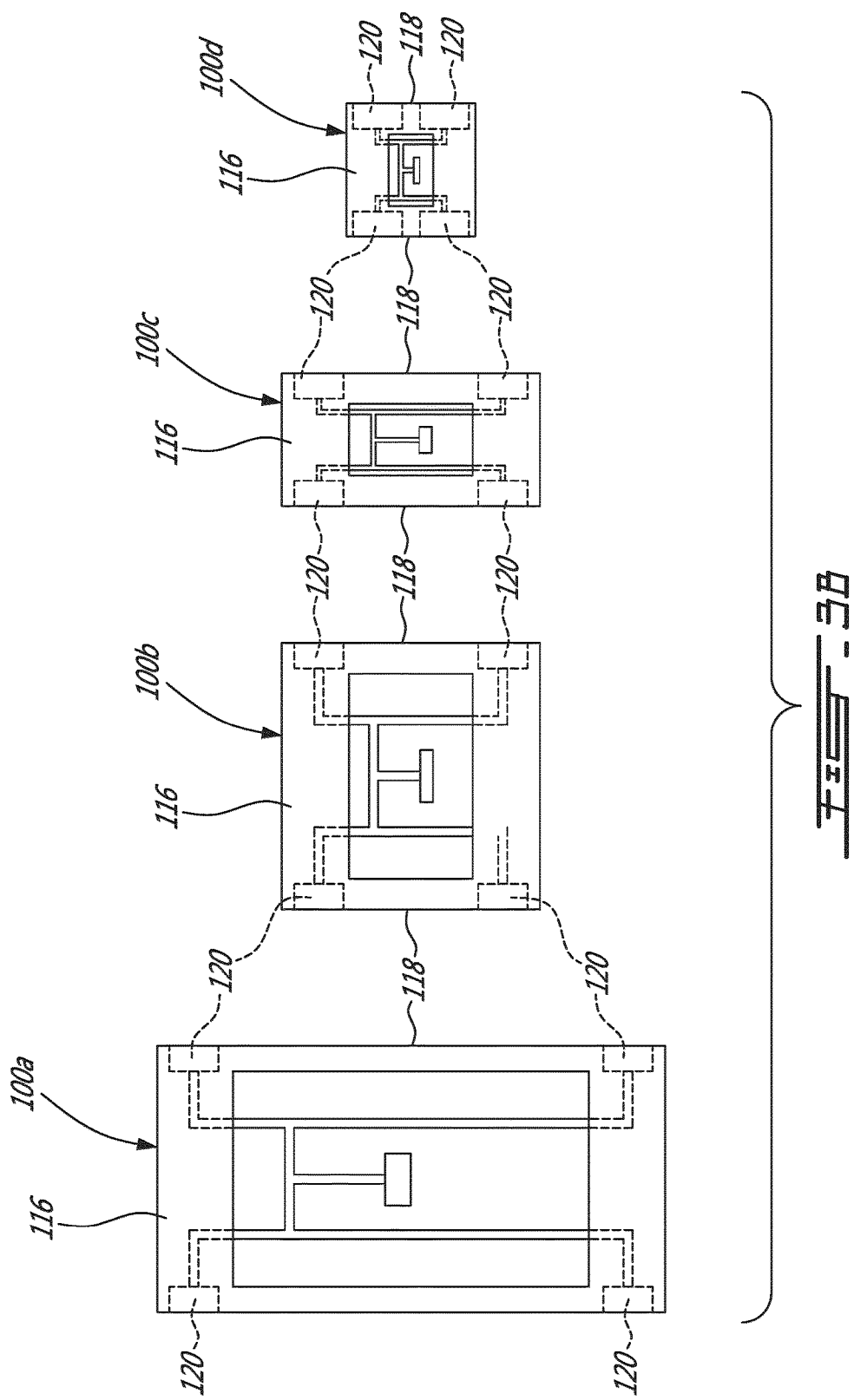

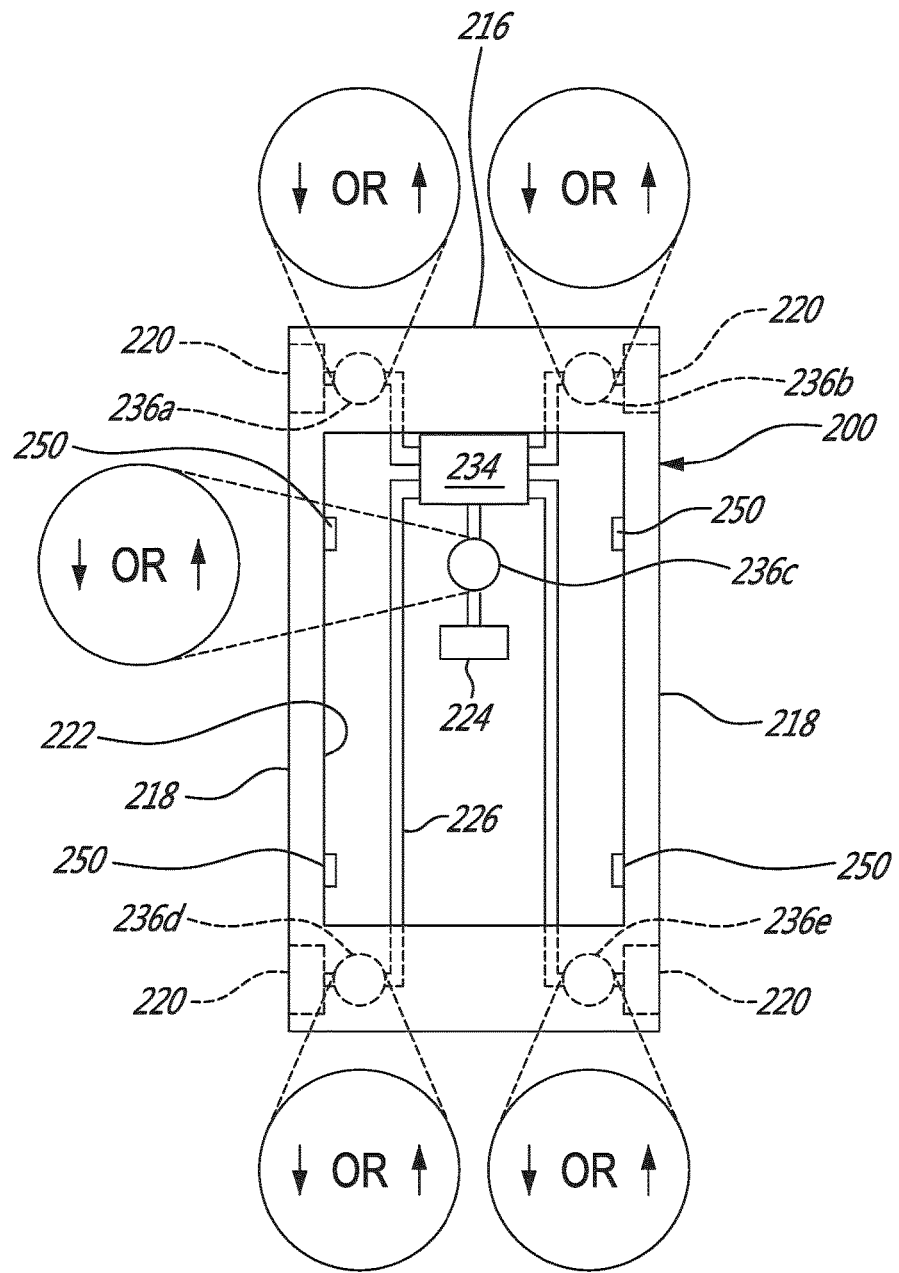

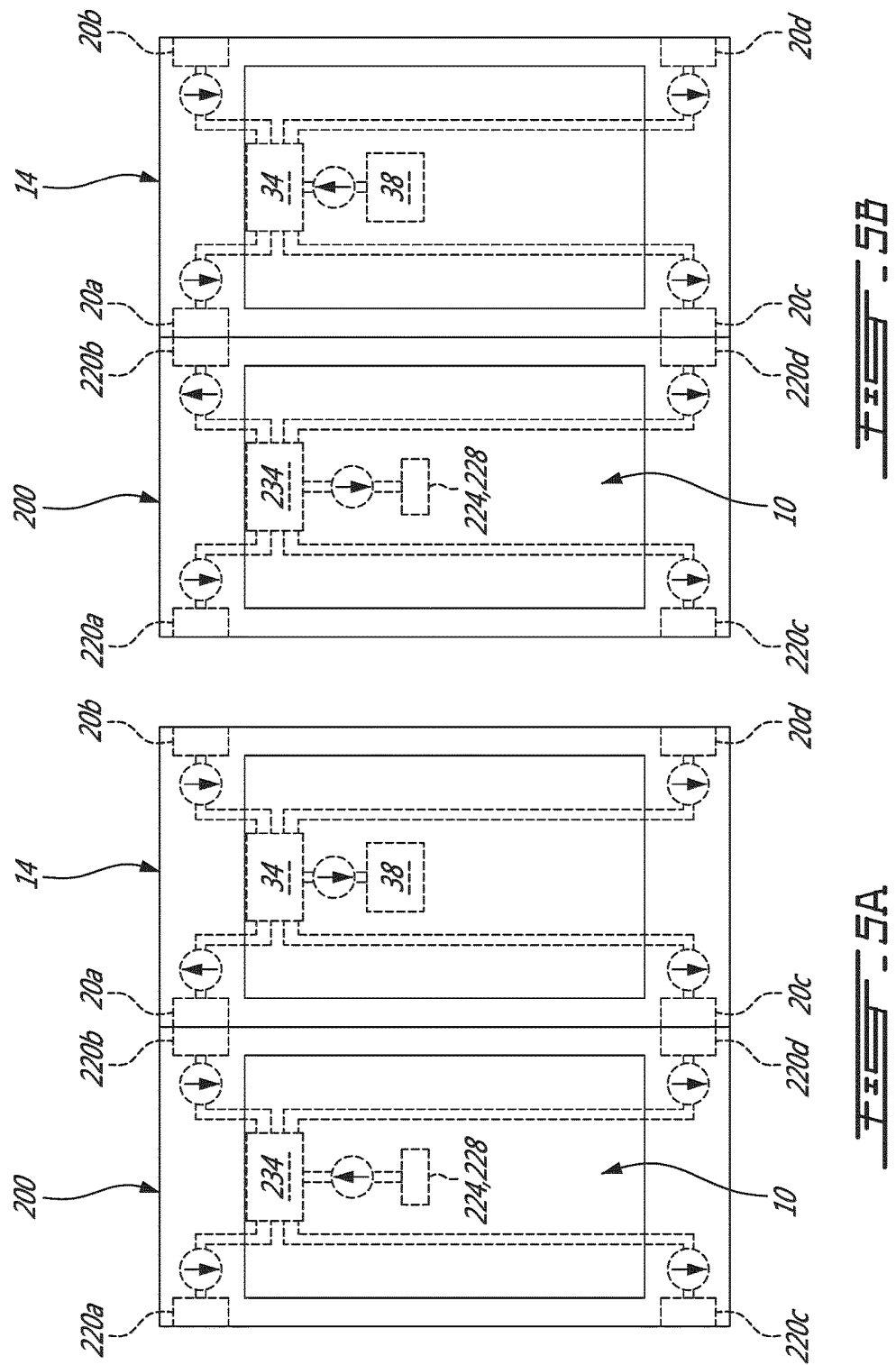

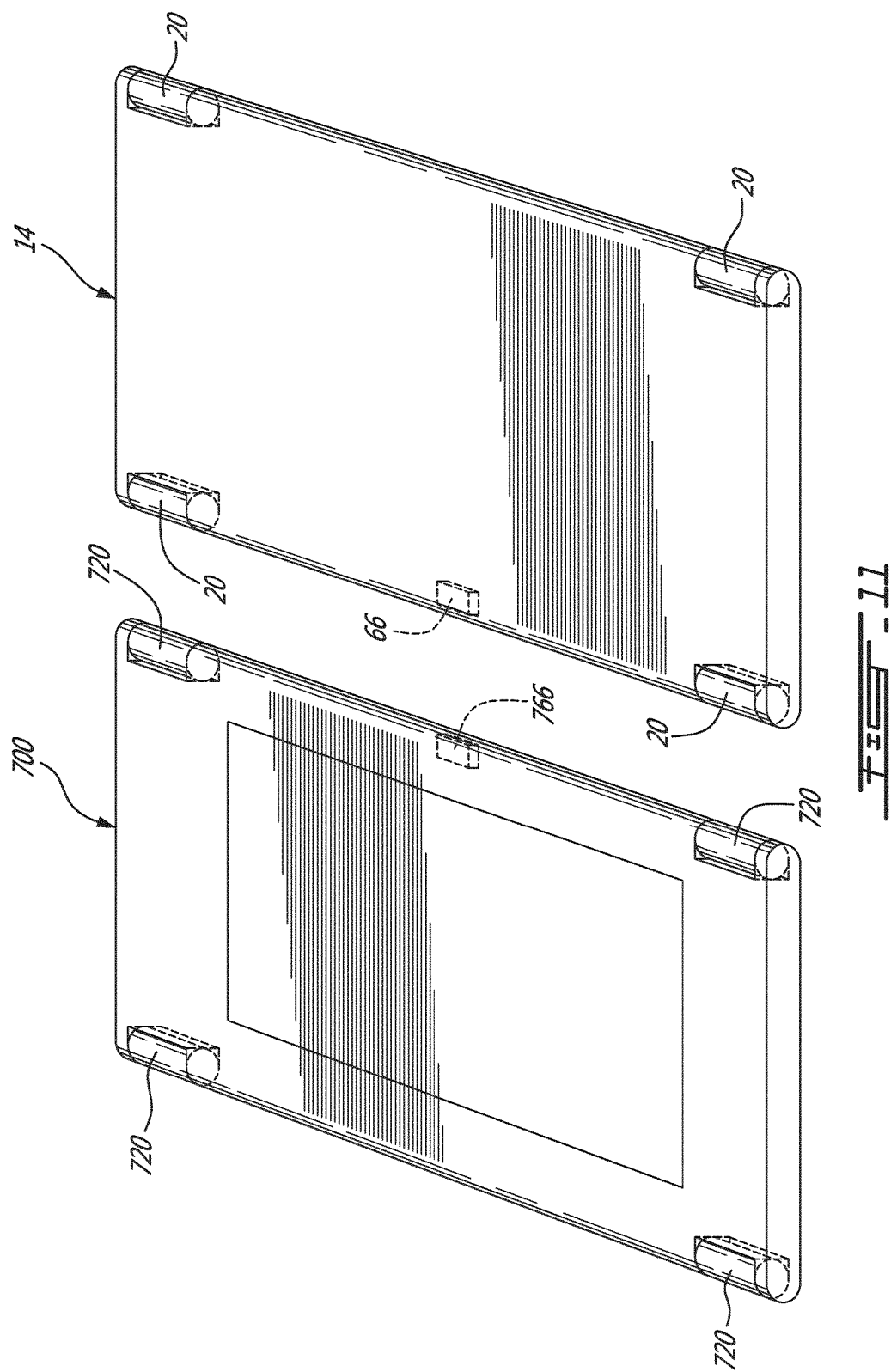

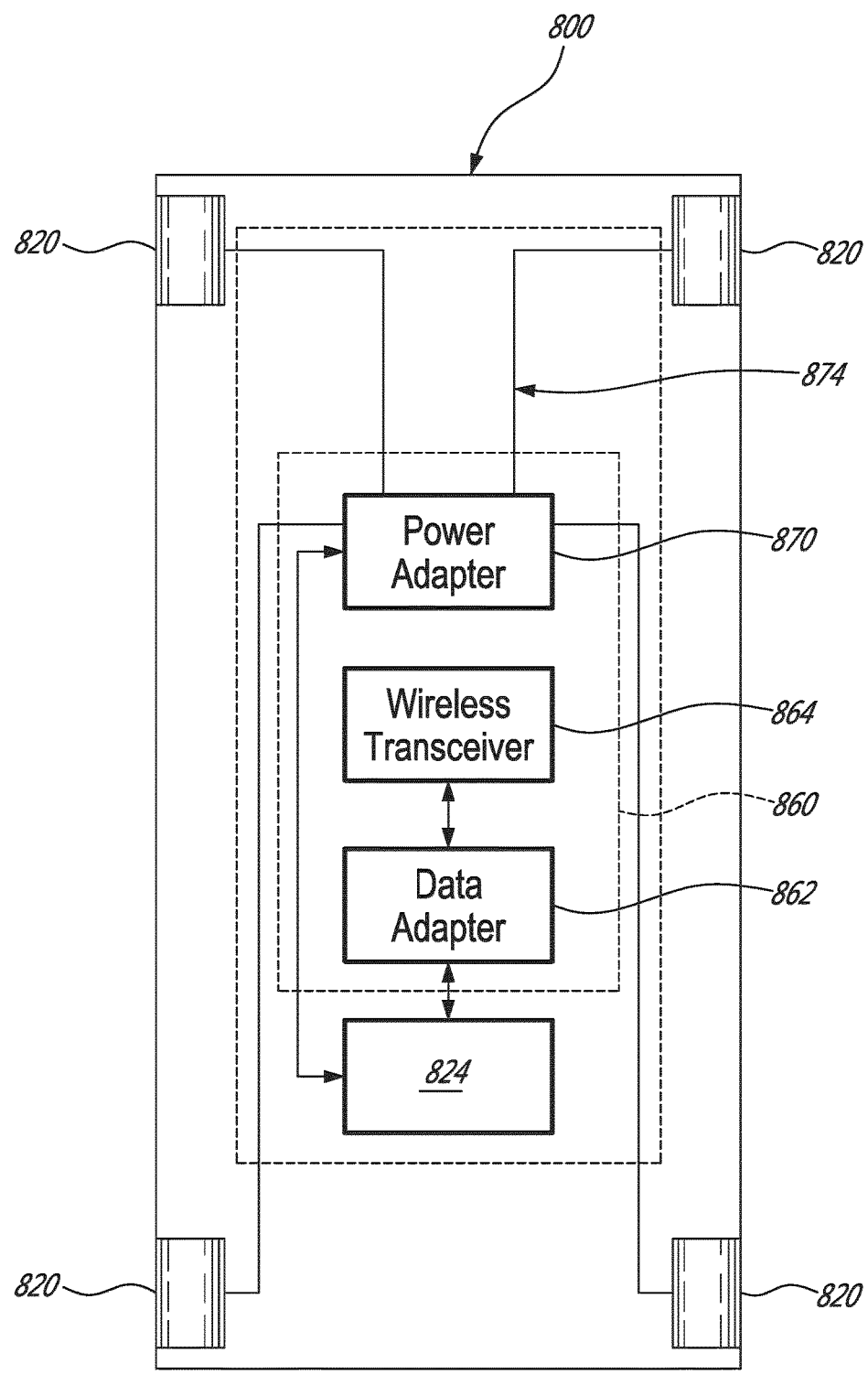

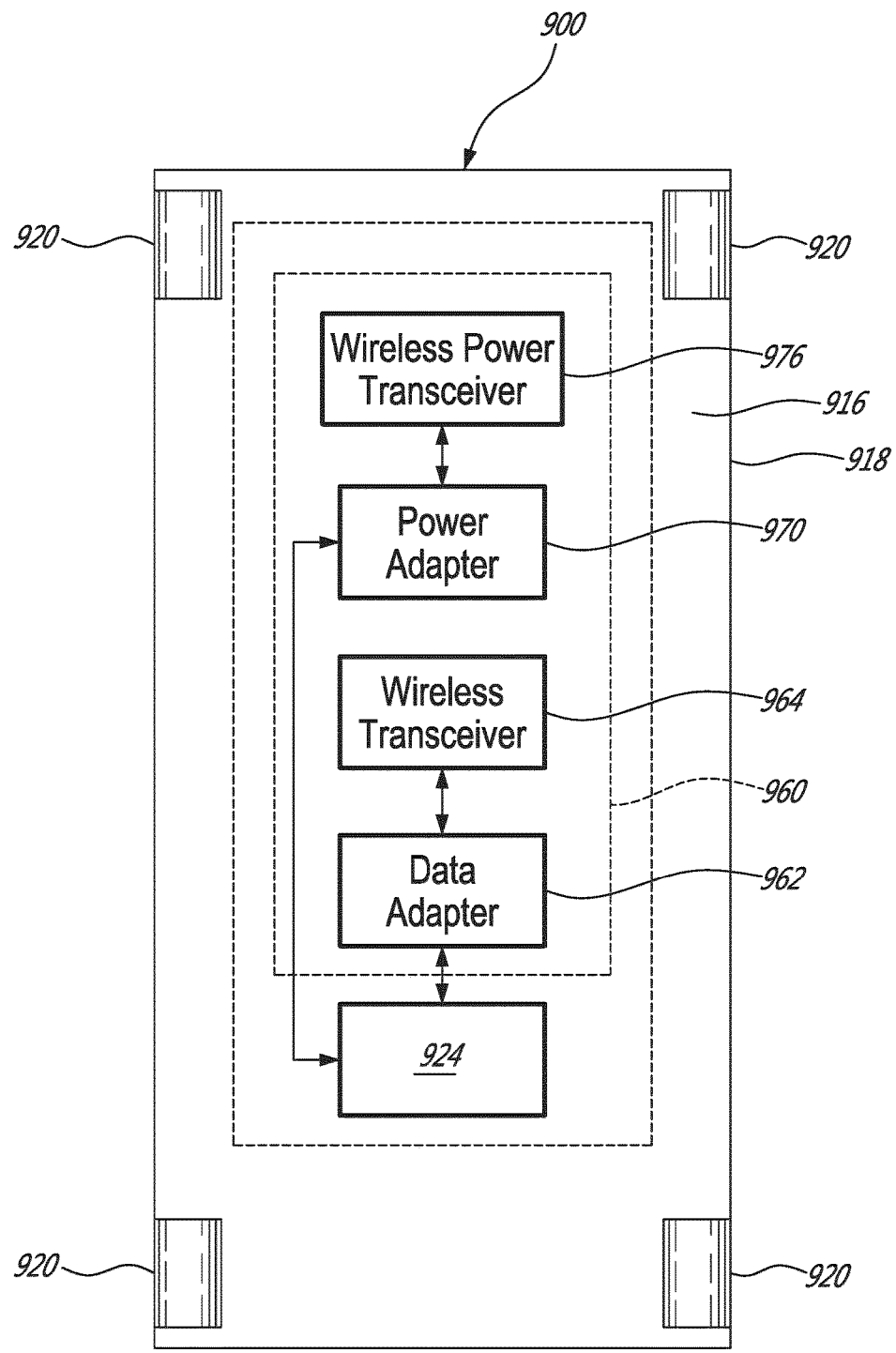

ADAPTORS FOR ADAPTING AN ELECTRONIC DEVICE TO A MODULAR ELECTRONIC DEVICE SYSTEM

FIELD

This disclosure relates to modular electronic device systems and more particularly to modular electronic devices which are connectable to one another using magnetic couplers.

BACKGROUND

Modular systems are typically characterized by corresponding modularity requirements that each modular electronic device of the modular system satisfies to couple to any other ones of the modular electronic devices of the modular system. For instance, these modularity requirements may include a standardized form factor, standardized dimensions, as well as standardized magnetic couplers localized at standardized locations along the lateral edges.

Although existing modular systems were satisfactory to a certain degree, there remains room for improvement

SUMMARY

In particular, it was desired to adapt other electronic devices to a modular system.

There is provided an adapter for adapting an electronic device which lacks the modularity requirements mentioned above to the modular system. The adapter is designed to comply with the modularity requirements of the modular system so that, when the adapter receives the electronic device in a cavity thereof, the electronic device can be mechanically coupled, with the other devices of the modular system. The adapter can additionally provide an electrical connectivity function allowing straightforward data signal or power signal communication between the adapted electronic device and the other electronic devices of the modular system.

In accordance with one aspect, the adapter comprises a housing having two lateral edges, a cavity between the lateral edges and being adapted to receive the electronic device. Each of the two lateral edges of the housing having at least one magnetic coupler connectable with at least one magnetic coupler of the modular electronic device system by coupling the at least one magnetic coupler of the adapter with the at least one magnetic coupler of the modular electronic device system. The adapter has an internal electric conductor network electrically connected to the magnetic couplers of the adapter and electrically connected to an internal connector which is electrically connectable to the electronic device when received in the cavity of the housing.

The adapter can have a connector hub electrically connected to the internal electric conductor network for selectively configuring any given one of the magnetic couplers and the internal connector of the adapter as an upstream connector or as a downstream connector, depending on, for instance, the type of electronic device which is to be adapted to the modular system.

In accordance with another aspect, there is provided an adapter for adapting an electronic device to a modular electronic device system. The adapter comprises a housing having two lateral edges, a cavity between the lateral edges of the housing and being adapted to receive the electronic device, each of the two lateral edges of the housing having at least one magnetic coupler coupleable with the magnetic couplers of the modular electronic device system.

In accordance with another aspect, there is provided a method of adapting an electronic device to a modular electronic device system, wherein modular electronic devices of the modular electronic device system each have a housing with two lateral edges, each of the lateral edges having at least one magnetic coupler allowing any two of the modular electronic devices to couple to one another by engaging corresponding ones of the magnetic couplers with one another, the adapter comprising a housing having two lateral edges, a cavity between the lateral edges of the housing, each of the two lateral edges of the housing having at least one magnetic coupler; the method comprising: engaging the electronic device into the cavity of the housing; and coupling the at least one magnetic coupler of the adapter having the engaged electronic device with one or more magnetic couplers of one of said modular electronic device.

In accordance with another aspect, there is provided an adapter for adapting an electronic device to a modular electronic device system wherein modular electronic devices of the modular electronic device system each have a housing with two lateral edges, at least one of the lateral edges having at least one magnetic coupler, and wherein any two of the modular electronic devices are connectable to one another by coupling corresponding magnetic couplers of the two modular electronic devices with one another, the adapter comprising: a housing having two lateral edges, a cavity between the lateral edges and being adapted to receive the electronic device and adapt the electronic device to be a first modular electronic device of the modular electronic device system, at least one of the two lateral edges of the housing having at least one magnetic coupler connectable with at least one magnetic coupler of the modular electronic device system by coupling the at least one magnetic coupler of the adapter with the at least one magnetic coupler of the modular electronic device system, the housing being configured to facilitate communication between the first electronic device and a second modular electronic device of the modular electronic device system when the two modular electronic devices are connected to one another by coupling corresponding magnetic couplers of the two modular electronic devices with one another.

In accordance with another aspect, there is provided an adapter for adapting an electronic device to a modular electronic device system, wherein modular electronic devices of the modular electronic device system each have a housing with two lateral edges, the lateral edges having at least one magnetic coupler allowing any two of the modular electronic devices to couple to one another by engaging corresponding ones of the magnetic couplers with one another, the adapter comprising: a housing having two lateral edges, a cavity between the lateral edges of the housing and being adapted to receive the electronic device, at least one of the two lateral edges of the housing having at least one magnetic coupler coupleable with the magnetic couplers of the modular electronic device system.

In accordance with another aspect, there is provided a method of adapting an electronic device to a modular electronic device system, wherein modular electronic devices of the modular electronic device system each have a housing with two lateral edges, at least one of the lateral edges having at least one magnetic coupler allowing any two of the modular electronic devices to couple to one another by engaging corresponding ones of the magnetic couplers with one another, the adapter comprising a housing having two lateral edges, a cavity between the lateral edges of the housing, at least one of the two lateral edges of the housing having at least one magnetic coupler; the method comprising: engaging the electronic device into the cavity of the housing; and coupling the at least one magnetic coupler of the adapter having the engaged electronic device with one or more magnetic couplers of one of said modular electronic device.

In accordance with another aspect, there is provided an adapter for adapting an electronic device to a modular electronic device system, wherein modular electronic devices of the modular electronic device system each have a housing with two lateral edges, the lateral edges having at least one magnetic coupler allowing any two of the modular electronic devices to couple to one another by engaging corresponding ones of the magnetic couplers with one another, the adapter comprising: a housing having two lateral edges, a cavity between the lateral edges of the housing and being adapted to receive the electronic device, at least one of the two lateral edges of the housing having at least one magnetic coupler coupleable with the magnetic couplers of the modular electronic device system; an internal connector being electrically connectable to the electronic device when received in the cavity of the housing; and an auxiliary adapter connected to the internal connector, the auxiliary adapter being configured to adapt communication between the electronic device and at least another one of said modular electronic devices of the modular electronic device system.

In accordance with another aspect, there is provided an adapter comprising: a housing having two lateral edges, a cavity between the lateral edges of the housing and being adapted to receive an electronic device, at least one of the two lateral edges of the housing having at least one magnetic coupler coupleable with at least one magnetic coupler of a modular electronic device; an internal connector being electrically connectable to the electronic device when received in the cavity of the housing; and an auxiliary adapter connected to the internal connector, the auxiliary adapter being configured to adapt communication between the electronic device and the modular electronic device.

Many further features and combinations thereof concerning the present improvements will appear to those skilled in the art following a reading of the instant disclosure.

DESCRIPTION OF THE FIGURES

In the figures,

FIGS. 1A-C are perspective views of two modular electronic devices being connected to one another in three respective configurations, in accordance with an embodiment;

FIG. 2A is a schematic view of examples of an adapter, an electronic device and a modular electronic device system, in accordance with an embodiment;

FIG. 2B is an exploded schematic view of examples of an adapter being sandwiched between two modular electronic devices, in accordance with an embodiment;

FIG. 2C is a perspective view of an adapter connected between two laterally adjacent modular electronic devices, in accordance with an embodiment;

FIG. 3A is a front elevation view showing four modular electronic devices having different form factors;

FIG. 3B is a schematic view showing four adapters each having a form factor corresponding to a form factor of a respective one of the modular electronic devices shown in FIG. 3A, in accordance with some embodiments;

FIG. 4 is a schematic view of an example of an adapter having a connector hub, in accordance with an embodiment;

FIG. 5A is a schematic view of an example of an adapter adapting an electronic device to a modular electronic device, showing the internal connector of the adapter configured as an upstream connector, in accordance with an embodiment;

FIG. 5B is a schematic view of the adapter of FIG. 5A, showing one of the magnetic couplers of the adapter configured as an upstream connector, in accordance with an embodiment;

FIG. 11 is an oblique view of the adapter of FIG. 10 shown adjacent to a modular electronic device of a modular electronic device system, in accordance with an embodiment;

FIG. 12 is a schematic view of an example of an adapter, depicting an example of an auxiliary adapter with a power adapter, in accordance with an embodiment; and FIG. 13 is a schematic view of an example of an adapter, showing an example of an auxiliary adapter with a wireless power transceiver, in accordance with an embodiment.

DETAILED DESCRIPTION

Figure 6:
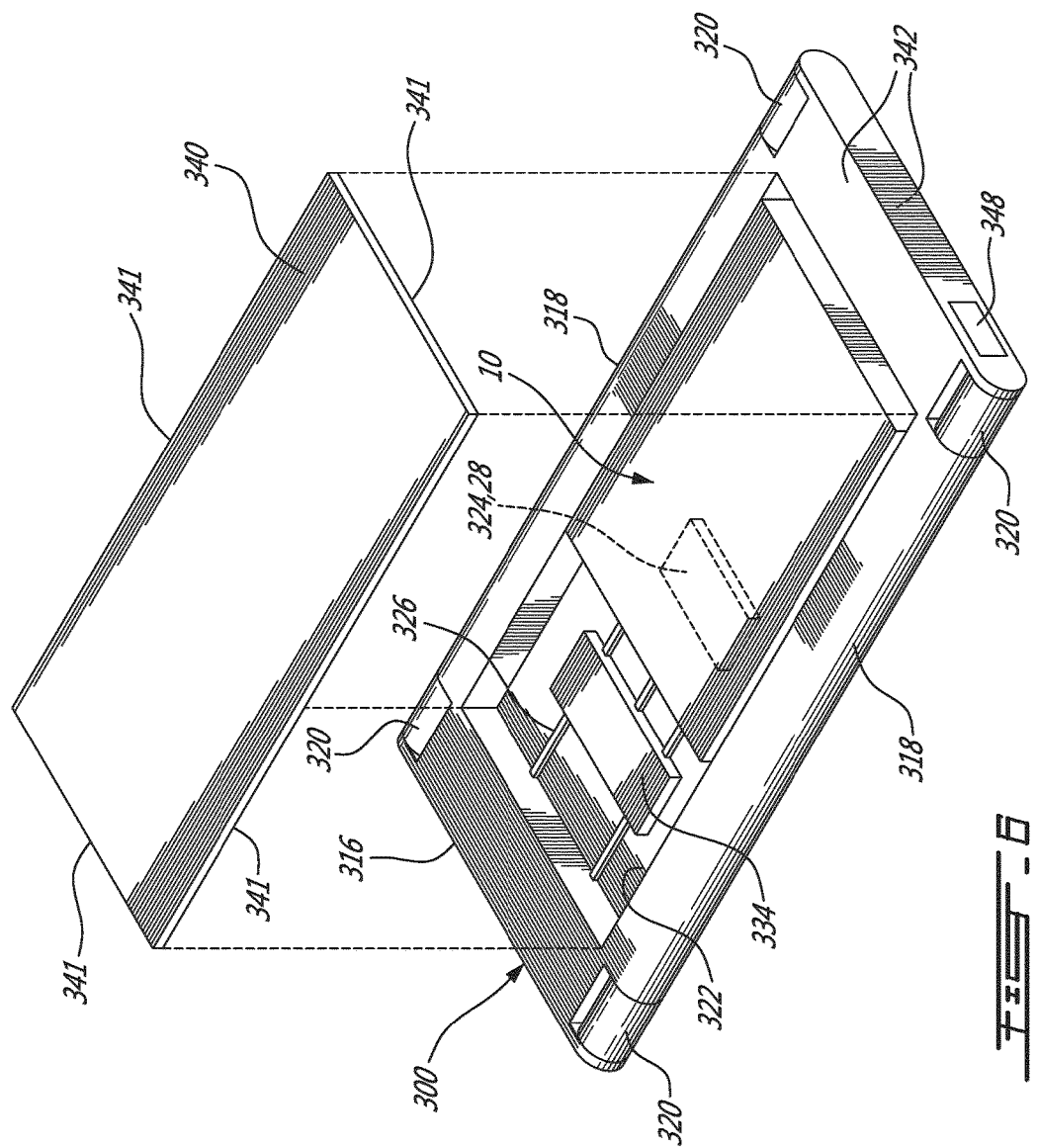
FIG. 6 is an oblique view of an example of an adapter, showing a lid in an exploded view, in accordance with an embodiment.

An example of a modular electronic device system 12 (referred to as "modular system 12") is shown in FIGS. 1A-C. This specific example has two modular electronic devices 14 connected to one another. Each modular electronic device 14 of the modular system 12 can be a mobile electronic device (e.g., a mobile phone, a tablet computer, a laptop computer, or the like). In this case, for instance, modular electronic devices 14 are provided in the form of mobile phones.

As shown, each modular electronic device 14 has a housing 16 having two lateral edges 18 and being equipped with two magnetic couplers 20 at each corner of the two lateral edges 18 of the housing 16. The magnetic couplers 20 are rotatable around an axis 15 extending along the lateral edges 18, and the lateral edges 18 are provided with a semi-circular shape acting as a projection of the shape of the magnetic couplers 20. The magnetic couplers 20 thus form a hinge around which the two or more modular electronic devices 14 can pivot relative to one another along their lateral edges 18 when coupled, allowing smooth switching from one of the configurations shown in FIG. 1A-C to another.

An example of possible magnetic couplers 20 is described in international patent application publication no. WO 2015/070321, in which each magnetic coupler 20 offers an electrical connection function in addition to its mechanical coupling function. Indeed, the two modular electronic devices 14 of the modular system 12 are electrically connectable to one another by magnetically coupling corresponding ones of the magnetic couplers 20 of the two modular electronic devices 14 with one another. This optional configuration can allow an electrical connection between the two modular electronic devices 14 to be maintained while pivoting the devices relative to one another.

Alternate embodiments of modular systems may exist or be developed.

Referring now to FIG. 2A, an adapter for adapting an electronic device 10 to the modular system 12 is generally shown at reference numeral 100. The electronic device 10 to be adapted to the modular system 12 using the adapter 100 can be, for instance, a battery, a memory (e.g., standard 2.5 inches hard drive sizes), a display, a wireless adapter, a speaker, a camera, sensors (e.g., infrared, motion, temperature, etc.), a smart phone having a form factor different from the standardized form factors of the modular system 12, etc.

As depicted, the adapter 100 has a housing 116 with two lateral edges 118. The housing 116 can be made from any suitable material (e.g., steel, aluminium, plastic) and it can contain water-proofing materials as well as being sealed, depending of the embodiment. Each lateral edge 118 has one, two or more magnetic couplers 120. In this specific embodiment, each of the magnetic couplers 120 is configured to allow an optional electrical connection with a respective one of the magnetic couplers 20 of the modular system 12a, in addition to the mechanical coupling which is achieved here by way of magnetic attraction. In this example, a magnetic coupler 120 is provided at each corner of each lateral edge 118 of the housing 116, i.e. one at an upper corner of the housing 116 and another one at a lower corner of the housing 116. As it can be seen, the housing 116 has a cavity 122 between the lateral edges 118 and being adapted to receive the electronic device 10. In this example, the electrical conductivity is achieved as follows: each of the magnetic couplers 120 are electrically connected to an internal connector 124 via an internal electric conductor network 126. The internal electric conductor network 126 can be provided in the form of electrical wires, conductive traces and the like. The internal connector 124 is configured to connect with an external connector 28 of the electronic device 10 when the electronic device 10 is received in the cavity 122 of the housing 116.

The cavity 122 can be sized to fit standard electronic devices. For instance, the electronic device 10 shown in FIG. 2A is provided in the form of a battery for supplying additional power to modular electronic devices 14 of the modular system 12. It is contemplated that, when the electronic device 10 is received in the cavity 122 of the housing 116 and the external connector 28 of the electronic device 10 is satisfactorily electrically connected to the internal connector 124 of the adapter 100, the internal electric conductor network 126 allows electricity to be conducted towards each of the magnetic couplers 120. The internal electric conductor network 126 also allows electricity to be conducted between each of the magnetic couplers 120 in a manner that a USB bus can be established through the housing 116 across the lateral edges 118. In this way, a first modular electronic device can be connected to a connector 120 on one side, and a second modular electronic device can be connected on the opposite side and a connection can be established between the first and the second modular electronic devices across the housing.

Upon coupling of the magnetic couplers 120 of one lateral edge 118 of the adapter 100 (when the electronic device 10 is received therein) with magnetic couplers 20 of one lateral edge 18 of an adjacent one of the modular electronic devices 14, both the electrical connection and the mechanical coupling can be established between the adapter 100 and the adjacent one of the modular electronic devices 14. The mechanical coupling is due to the magnetic attraction between one or more magnetic couplers 120 of the adapter 100 and one or more magnetic couplers 20 of the adjacent one of the modular electronic devices 14. As for the electrical connection, the internal electric conductor network 126 of the adapter 100 is electrically connected to the magnetic couplers 120 and an internal electric conductor network 26 of the modular electronic device 14 is electrically connected to the magnetic couplers 20 of the modular electronic device 14. Therefore, the electricity can be conducted from the internal electric conductor network 126 of the adapter 100 to the internal electric conductor network 26 of an adjacent one of the modular electronic devices 14 when the adapter 100 is connected to the adjacent one of the modular electronic devices 14. In the specific example shown in FIG. 2A, the two modular electronic devices 14 are shown electrically connected and mechanically coupled to one another. In alternate embodiments, the electrical conductivity can be provided in alternate contact, or contact-less manners, in a manner to satisfactorily transfer a data signal or power signal from one device to another, for instance. In still other embodiments, the adapter can be provided with only a mechanical coupling function, with the communication of data signals or electrical power signals between devices being achieved by features integrated within the devices themselves.

As mentioned above, the adapter 100 is an example embodiment designed to specifically satisfy the modularity requirements of the modular system 12 illustrated in FIGS. 1A-C and FIG. 2A. For instance, FIG. 2B shows an exploded view the adapter 100 and the electronic device 10 about to be sandwiched between the two modular electronic devices 14. FIG. 2C shows the adapter 100 connected between two laterally adjacent modular electronic devices 14, i.e. one of the modular electronic devices 14 is connected to one of the lateral edges 118 of the adapter 100, and another one of the modular electronic devices 14 is connected to the other one of the lateral edges 118 of the adapter 100. It is understood that in these two latter configurations, the internal electric conductor network of the adapter 100 can bridge a magnetic coupler 120 on one of the lateral edges 118 to a magnetic coupler 120 on the other one of the lateral edges 118, to establish a bridge across the adapter 100. Alternate embodiments can be designed to satisfy alternate modularity requirements. Modularity requirements can generally relate to one or more of standardized form factors, standardized dimensions, standardized couplers and/or connectors, for instance. The standardized magnetic couplers 20 and also standardized locations of the magnetic couplers along the lateral edges 18 of the modular electronic devices 14.

For instance, FIG. 3A shows examples of modular electronic devices having different standardized form factors. These modular electronic devices will respectively be referred to as first, second, third and fourth modular electronic devices 14a, 14b, 14c and 14d for ease of reading. As it can be seen, the first modular electronic device 14a has a form factor (i.e. an indication of an area of a main face of the modular electronic device) which can correspond to that of the typical smart phone and can be referred to as a full block form factor. The second modular electronic device 14b has an half block form factor which corresponds to a half of the full block form factor of the first modular electronic device 14a. The third modular electronic device 14c has a quarter block form factor which corresponds to a quarter of the full block form factor of the first modular electronic device 14a. The fourth modular electronic device 14d has an eighth block form factor which corresponds to an eighth of the full block form factor of the first modular electronic device 14a. Indeed, referring now to FIG. 3B, first, second, third and fourth adapters 100a, 100b, 100c and 100d having four different form factors are shown. The dimension of interest of the form factor is the area occupied by the modular electronic device 14 when placed flat. So, two modular electronic devices having the half block form factor (referred to as "two half blocks") can be tiled to occupy the same area as a full block form factor. Similarly, four "quarter blocks" can be tiled to occupy the same area as a full block form factor, and so on. As it can be noticed, each of the form factors of the adapters shown in FIG. 3B corresponds to a respective one of the full block form factor, the half block form factor, the quarter block form factor and the eighth block form factor shown in FIG. 3A. In alternate embodiments, the adapter can have any suitable form factor which may correspond to one multiple of the full block form factor of a modular electronic device.

Referring back to FIG. 3A, it is noticed that the magnetic couplers 20 of each one of the modular electronic devices 14a, 14b, 14c and 14d are provided at standardized locations along the lateral edges 18 of the housings 16, i.e. at each corner thereof. Correspondingly, the magnetic couplers 120 of the adapters 100a, 100b, 100c and 100d are also provided along the lateral edges 118 of the housings 116 at each corner thereof. In possible embodiments, the magnetic couplers of the adapter can be localized anywhere along lateral edges of the adapter as long as the locations of the magnetic couplers of the adapter correspond to locations of magnetic couplers of a modular electronic device.

For standardization purposes, it may be preferred to provide the adapter 100 with magnetic couplers 120 which are identical to, or at least compatible with, the magnetic couplers 20 of the modular system 12. The magnetic couplers 120 of the adapter 100 allow both a mechanical coupling (by way of magnetic attraction) and an electrical connection between the modular electronic device 14 and the adapter 100. More specifically, each magnetic coupler 120 can include one or more magnets mounted within the housing 116 of the adapter 100. Such magnets can be made from rare earth materials, such as Neodymium-Iron-Boron (NdFeB), Samarium-cobalt, which are generally commercially available. Such magnets can also be made from iron, nickel or other suitable alloys. A significant magnetic force can be applied between the adapter 100 and an adjacent one of the modular electronic devices 14 to retain the latters in the desired configuration. In one embodiment, the magnets of the magnetic couplers 20,120 are mounted such that they are free to move under the magnetic forces present from an adjacent magnet and thereby provide the requisite magnetic field strength to retain the components in that configuration. Examples of such magnetic couplers 20,120 are described in international patent application publication no. WO 2015/070321 and in U.S. patent application Ser. No. 14/918,177. Other magnetic couplers can also be used. For instance, in some alternate embodiments of the magnetic coupler, the magnets do not move relative to the housing.

Each magnetic coupler 120 can have a cylindrical shape with a longitudinal axis positioned along a lateral edge 118 of the adapter 100. The lateral edges 118 of the adapter 100 can be rounded to facilitate rotation of the adapter 100 relative to the modular electronic device 14 while maintaining the mechanical coupling and the electrical connection.

For instance, the adapter 100 and the modular electronic device 14 can be connected and coupled to one another in a variety of positions. For example, the adapter 100 and the modular electronic device 14 can be placed side-by-side, with lateral surfaces abutting, similarly to the configuration shown in FIG. 1A. The adapter 100 and the modular electronic device 14 can also be placed on top of one another, so that a top or bottom surface of the adapter 100 abuts a top or bottom surface of the modular electronic device 14, similarly to the configuration shown in FIG. 1B. In some embodiments, the adapter 100 and the modular electronic device 14 may be placed side-by-side and pivoted relative to one another, similarly to the configuration shown in FIG. 10. In each of the depicted orientations, respective magnetic couplers 120, 20 of the adapter 100 and the modular electronic device 14 are positioned proximate one another. Other orientations are possible, as will be apparent.

When the adapter 100 is connected to the modular electronic device 14, a magnetic coupler 120 of the adapter 100 is positioned adjacent a magnetic coupler 120 of the modular electronic device 14. In this position, the magnets of the magnetic couplers 120,20 are adjacent to one another and attract each other. So positioned, the magnets of the adjacent magnetic couplers 120, 20 can interact to magnetically couple and/or electrically connect one another. For example, in some embodiments, one or more magnets may slide or rotate so that the respective north and south poles of adjacent magnets are aligned. In some embodiments, once the magnets are engaged, an electrical connection may be formed for providing data and/or power paths. In some embodiments, the electrical connection may be formed through contacts disposed on housings 116,16, the contacts being in electrical communication with respective magnets. In another embodiment, the magnets may protrude through respective housings 116,16 such that they contact each other directly. In other embodiments, electrical connections may be formed through leads carried by the magnets, rather than the magnets themselves.

In an embodiment, the adapter 100 is USB compatible. In such an embodiment, the magnetic couplers 120, the internal electric conductor network 126 and the internal connector 124 can all be USB compatible. Examples of USB compatible magnetic couplers are described in international patent application publication no. WO 2015/070321 with particular reference to FIGS. 30A, 30B, 32A and 32B and in U.S. patent application Ser. No. 14/918,177. In cases where the electronic device 10 is USB compatible, the electronic device 10 can be connected directly to the internal connector 124. For instance, the internal connector 124 can be any standard USB connector (USB 2.0, USB 3.0, USB-C, Micro USB, etc.). Alternatively, in cases where the external connector 28 of the electronic device 10 is not USB compatible, an auxiliary adapter (e.g., SATA or DVI to USB) can be connected to the internal connector 124 for allowing the external connector 28 to satisfactorily connect, although indirectly, to the internal connector 124. Conversely, where the external connector 28 is USB compatible, an auxiliary adapter can be used. The auxiliary adapter can be used to adapt wired or wireless communication between the electronic device 10 and one or more modular electronic devices of the modular electronic device system. For instance, the auxiliary adapter can adapt communication between a first communication protocol of the electronic device and a second communication protocol of a modular electronic device. In one embodiment, the first communication protocol is USB whereas the second communication protocol can be SATA, DVI or any other suitable communication protocol.

Referring now to FIG. 4, another example of an adapter is generally shown at 200. In describing this embodiment, like elements will bear like reference numerals but in the 200 series instead of in the 100 series. Accordingly, the adapter 200 has a housing 216 having two lateral edges 218 and a cavity 222 therebetween. Magnetic couplers 220 are provided at each corner along the lateral edges 218, and an internal electric conductor network 226 connects the magnetic couplers 220 to an internal connector 224. The internal electric conductor network 226 also allows electricity to be conducted between each of the magnetic couplers 220 so that a USB bus can be established through the housing 216 across the lateral edges 218. In this way, a first modular electronic device can be connected to a magnetic coupler 220 on one side, and a second modular electronic device can be connected on the opposite side. A connector hub 234 is connected in the internal electric conductor network 226. Each of the magnetic couplers 220 and the internal connector 224 is electrically connected to the connector hub 234. Broadly described, the connector hub 234 is operable to selectively configure each of the magnetic couplers 220 and the internal connector 224 as an upstream connector or downstream connector. The connector hub 234 can be provided in the form of a chip on a printed circuit board (PCB), for instance. Accordingly, the insets 236a, 236b, 236c, 236d and 236e of the internal electric conductor network 226 indicate whether each connector is configured as an a downstream connector (represented by a downward arrow) or as an upstream connector (represented by an upward arrow). Dynamic configuration of the magnetic couplers 220 and of the internal connector 224 allows the electronic device 10 to be configured either as a host device or as a slave device. For instance, the adapter 200 can be configured either as a slave device when the electronic device 10 is a battery or any other suitable slave or as a host device when the electronic device 10 is a smart phone, a camera, or any suitable host.

As depicted, the adapter 200 shown in FIG. 4 has mounts 250 for attaching the electronic device 10 to the housing 216. Examples of such mounts 250 are screw holes and screws (e.g., standard camera ¼-20 UNC or ⅜-16 UNC thread), rails (e.g., standard hard drive rails), magnets, and the like. The number of mounts 250 can differ from an embodiment to another. The mounts are optional.

In the case where the adapter 200 is USB compatible, the connector hub 234 is also USB compatible. In this case, the connector hub 234 can dynamically provide a single upstream connector amongst the magnetic couplers 220 and the internal connector 224 and can also provide a plurality of downstream connectors amongst the remaining ones of the magnetic couplers 220 and the internal connector 224. The upstream connector is to be connected to a host device and the downstream connectors are to be connected to a respective one of a plurality of slave devices. An example of a connector hub 234 which is USB compatible and that can dynamically configure connectors as downstream or upstream connectors is described in provisional patent application Ser. No. 62/099,941, the contents of which are hereby incorporated by reference. However, the connector hub 224 is not limited to this example nor to any connector hub which is limited to USB communication protocol.

FIG. 5A shows an exemplary configuration where the adapter 200 is connected to a modular electronic device 14. In this configuration, the adapter 200 is configured as a host device whereas the modular electronic device 14 is configured as a slave device. For instance, the internal connector 224 of the adapter 200 is configured as an upstream connector and magnetic couplers 220a, 220b, 220c and 220d of the adapter 200 are configured as downstream connectors. Accordingly, one magnetic coupler 20a which is adjacent to the adapter 200 is configured as an upstream connector whereas the other magnetic couplers 20b, 20c and 20d and processor 38 are configured as downstream connectors. It is envisaged that in this configuration, a control signal can be sent from the internal connector 224 to the magnetic couplers 220a, 220b, 220c and 220d within the adapter 200. The control signal can be received by the modular electronic device 14 and sent, by the magnetic coupler 20a (configured as an upstream connector), to the other magnetic couplers 20b, 20c and 20d and the processor 38 of the modular electronic device 14. In this exemplary configuration, the electronic device 10 can be a camera that sends image data to be stored on a memory of the modular electronic device 14 and/or to be processed by the processor 38 of the modular electronic device 14. During operation, the adapter 200 can dynamically transition to being a slave device (e.g. when a camera's internal memory needs to be read by a modular electronic device 14).

FIG. 5B shows another exemplary configuration where the adapter 200 is connected to a modular electronic device 14. As depicted, the adapter 200 is configured as a slave device whereas the modular electronic device 14 is configured as a host device. For instance, the processor 38 of the modular electronic device 14 is configured as an upstream connector and the magnetic couplers 20a, 20b, 20c and 20d are configured as downstream connectors. Accordingly, one magnetic coupler 220b (or alternatively magnetic coupler 200d) of the adapter 200, which is adjacent to the modular electronic device 14, is configured as an upstream connector whereas the other magnetic couplers 220a, 220c and 220d (or alternatively magnetic coupler 220b) and the internal connector 224 are configured as downstream connectors. A control signal can be sent from the processor 38 to the magnetic couplers 20a, 20b, 20c and 20d within the modular electronic device. The control signal can be received by the adapter 200 and then be sent, by the magnetic coupler 220b (configured as an upstream connector) to the other magnetic couplers 220a, 220c and 220d and the internal connector 224. In this configuration, the electronic device 10 can be a memory for storing data of a data signal communicated by the modular electronic device 14.

In an embodiment, the connector hub 234 configures the magnetic couplers 220 and the internal connector 224 as downstream and/or upstream connectors shortly after reception of the electronic device 10 into the cavity 222 of the adapter 200, e.g., upon connection of the external connector 228 of the electronic device 10 to the internal connector 224 of the adapter 200. In this embodiment, the connector hub 34 of the modular electronic device 14 configures the magnetic couplers 20a-d and the processor 38 as downstream or upstream connectors upon connection of magnetic couplers 220b and 220d of the adapter 200 to magnetic couplers 20a and 20b of the modular electronic device 14. For instance, a signal indicating that the adapter 200 is to be used either as a slave device or as a host device can be sent from one of the magnetic couplers 220b and 220d of the adapter 200 to the modular electronic device 14 upon connection of the adapter 200 to the modular electronic device 14. It is understood that the configuration of the magnetic couplers as downstream or upstream connectors is dynamic so that it can be modified during use. In other words, the adapter 200 can dynamically transition to being a slave device or a host device depending on the electronic device 10 and/or the modular electronic device 14 connected to the adapter 200.

It is envisaged that in the case where the electronic device 10 is a battery, the battery connected to the adapter 200 can be used to provide a power signal to the connector hub 234, to any other electronic device that can be received in the cavity (see example shown in FIG. 9) and/or to any of interconnected ones of the modular electronic devices 14 of the modular system 12. The battery can be recharged from a power signal provided to any of the magnetic couplers. A power signal can be delivered and/or received at the power source provided to any of the magnetic couplers. Direction of the power signal may be selected, according to the USB power delivery standard.

FIG. 6 shows another example of an adapter 300, in accordance with another embodiment. In describing this embodiment, like elements will bear like reference numerals but in the 300 series, instead of in the 100 and the 200 series. As depicted, the adapter 300 has a housing 316 having two opposite lateral rounded edges 318. Each lateral edge 318 has two magnetic couplers 320, one at each corner of the housing 316. The housing 316 has a cavity 322 between the two opposite lateral rounded edges 318. An electronic device 10 is shown received in the cavity 322. The magnetic couplers 320 are connected to an internal connector 324 via an internal electric conductor network 326. As depicted, a connector hub 334 is provided in the internal electric conductor network 326. It is noted that in this embodiment, the adapter 300 has a lid 340 provided as part of one of two opposite faces 342 of the housing 316. The lid 340 can be openable (e.g., removable). The lid 340 leads to the cavity 322 to allow the electronic device 10 to be received into the cavity 322 and the external connector 28 of the electronic device 10 to be connected to the internal connector 324 during use. The lid 340 allows for swapping in or out any given electronic device 10 received in the cavity 322. For instance, when the electronic device 10 is provided in the form of a battery, the latter can be removed from the adapter 300 and replaced by another electronic device 10. The lid 340 is optional. In an embodiment, the lid 340 can have a sealing perimeter 341 allowing the housing 316 to be sealed when the lid 340 is closed. In an alternate embodiment, the cavity of the adapter is accessible not by the lid 340 but by a removable end cap. Other ways to access the cavity 322 are possible.

As shown in FIG. 6, the housing 316 can be provided with a DC power socket 348 for powering either or both the electronic device 10 and/or an adjacent one of the modular electronic devices. Alternatively or additionally, the housing 316 can be provided with a conventional USB connector for connecting USB devices thereto.

Figure 7:
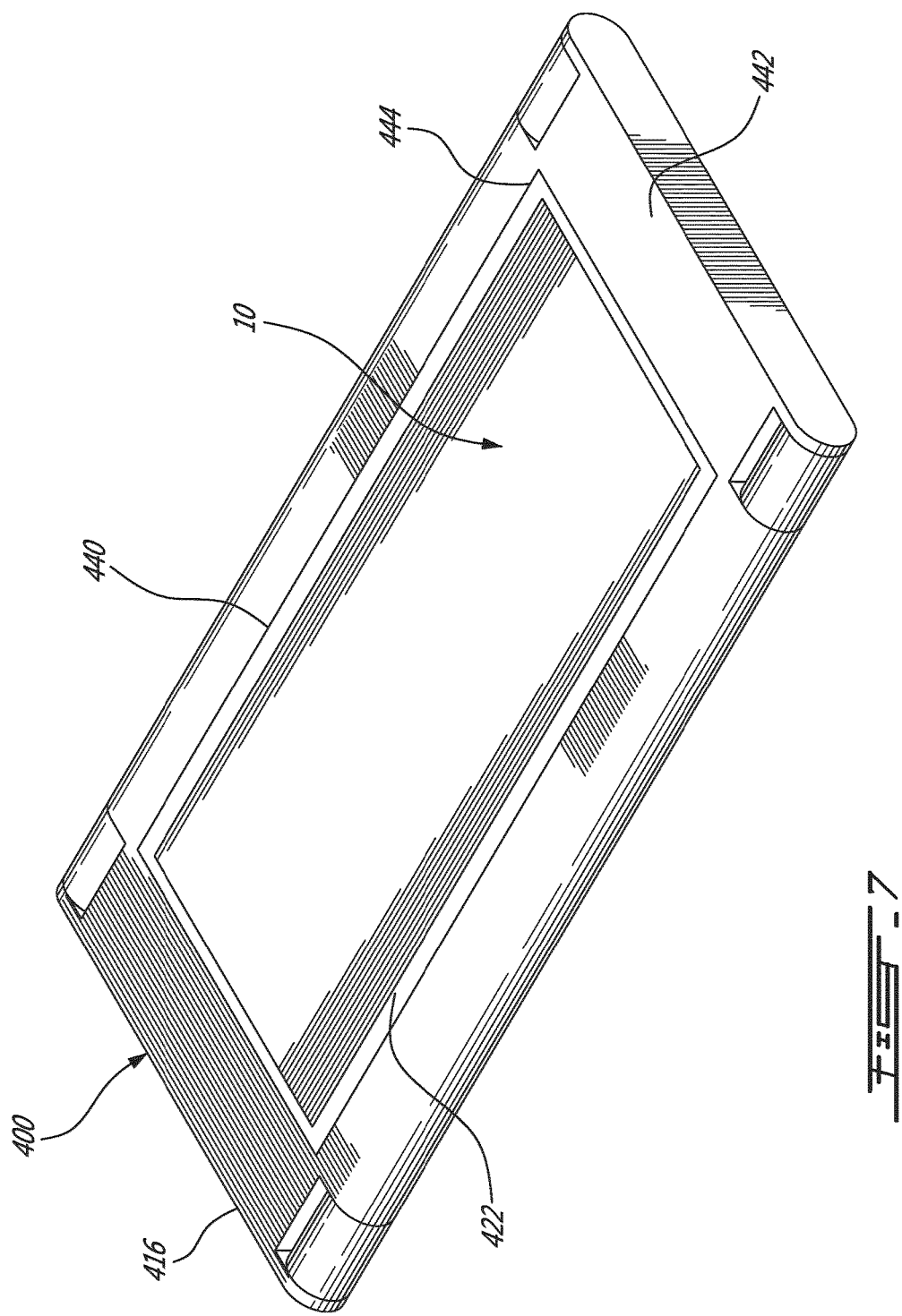
FIG. 7 is an oblique view of an example of an adapter, exposing a display screen received in a cavity of the adapter, in accordance with an embodiment.

FIG. 7 shows another example of an adapter 400, in accordance with another embodiment. In describing this embodiment, like elements will bear like reference numerals but in the 400 series, instead of in the 100, the 200 and the 300 series. As shown, the cavity 422 is sized to receive an electronic device 10 provided in the form of a display (e.g., a Liquid Crystal Display (LCD)). The cavity 422 of the adapter 400 can be configured to snugly receive the electronic device 10 such that a face 442 of the housing 416 is substantially coplanar relative to an outer face of the electronic device when it is received in the cavity 422. In this embodiment, the cavity 422 can be closed by an optional lid 440 having a transparent portion 444 which allows to see the electronic device 10 (e.g., a viewing screen) when received in the cavity 422. The transparent portion 444 of the lid 440 can be made of glass or any other suitable transparent material.

Figure 8:
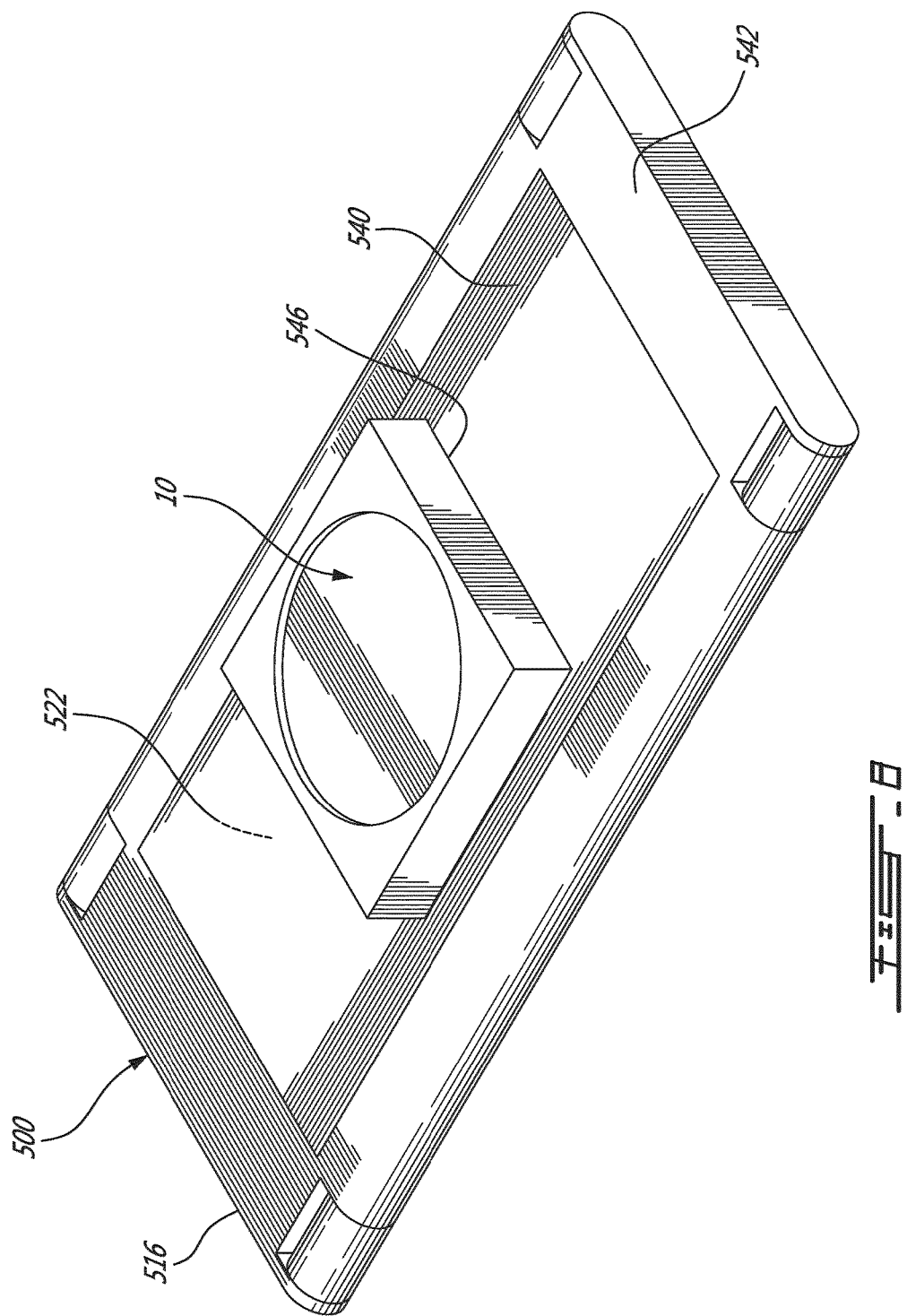
FIG. 8 is an oblique view of an example of an adapter, showing an example of a protruding electronic device received in a cavity of the adapter, in accordance with an embodiment.

FIG. 8 shows another example of an adapter 500, in accordance with another embodiment. In describing this embodiment, like elements will bear like reference numerals but in the 500 series. In this embodiment, the lid 540 is provided with an aperture 546 (the lid 540 can have more than one aperture). As illustrated, the electronic device 10 is provided in the form of a camera which protrudes from a face 542 of the housing 516 of the adapter 500 when it is received in the cavity 522. Other examples of electronic devices 10 that can protrude from the face 542 are camera lenses, sensors, antennas, etc. The aperture 546 snugly surrounds the protruding electronic device 10 when it is received in the cavity 522 of the adapter 500. In alternate embodiments, the electronic device 10 does not necessarily protrude from the aperture 546 of the cavity 522. The aperture 546 can be provided to expose at least a portion of the cavity 522 in order to allow access to the electronic device 10 (e.g., a display of the electronic device 10, user interface elements such as buttons, etc).

Figure 9:
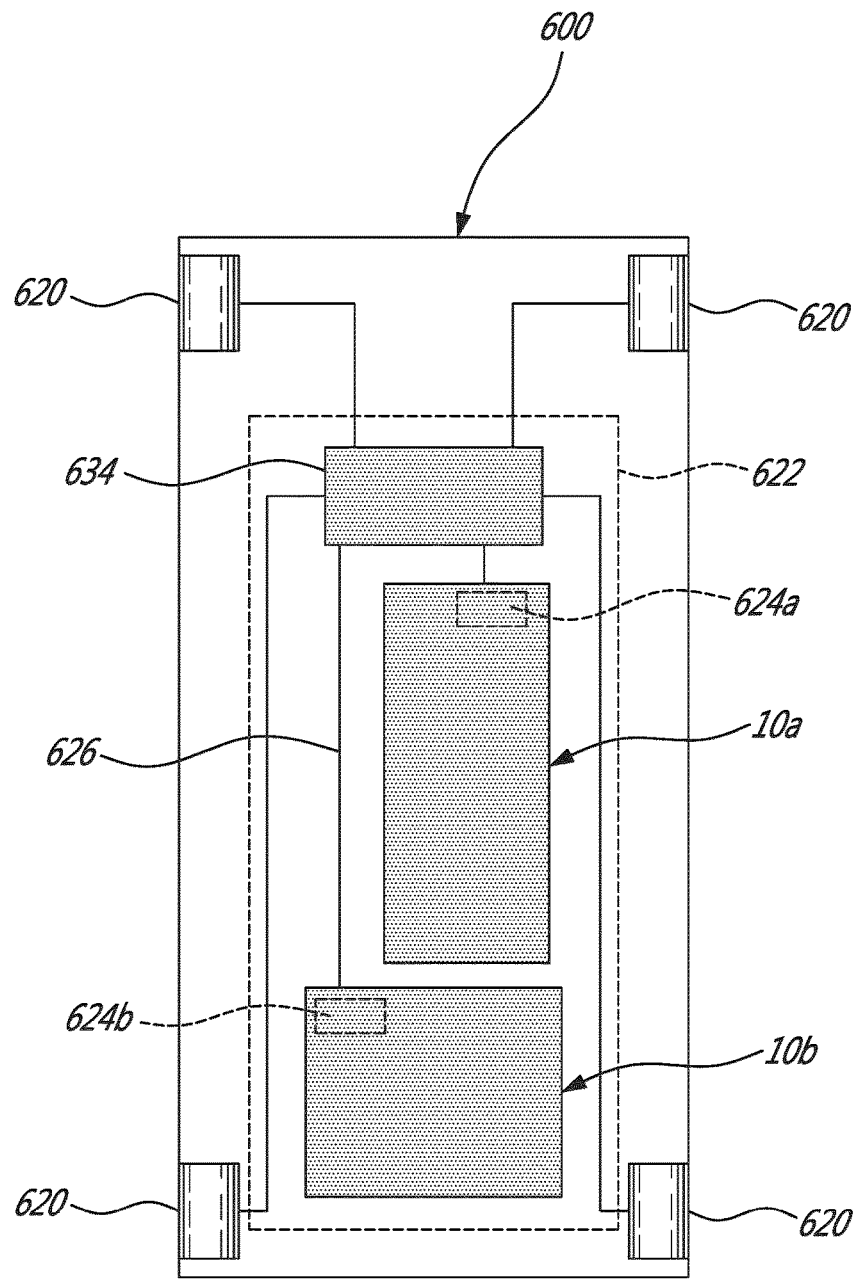
FIG. 9 is a schematic view of an example of an adapter configured for adapting two different electronic devices to a modular system.

FIG. 9 shows another example of an adapter 600, in accordance with another embodiment. In describing this embodiment, like elements will bear like reference numerals but in the 600 series. In this illustrated embodiment, the cavity 622 of the adapter 600 is sized to receive two electronic devices 10a and 10b. The electronic devices 10a and 10b are received in the cavity 622 and are connected to the internal electric conductor network 626 via two internal connectors 624a and 624b. Each of the magnetic couplers 620 and the internal connectors 624a and 624b is connected to the connector hub 634 for selectively configured either of the connectors as downstream or upstream connectors. In an alternate embodiment, the cavity 622 has separating walls defining two subcavities, each subcavity being sized to receive a respective one of the two electronic devices 10a and 10b. In alternate embodiments, the cavity 622 can be sized to receive more than two electronic devices. Depending on the use of the adapter 600, the two electronic devices 10a and 10b can be standalone electronic devices or alternatively, one of the two electronic devices 10a and 10b can be an electronic device requiring an external power source while the other one of the two electronic devices 10a and 10b can be the required external power source. In some alternate embodiments, the adapter can be configured to receive more than two electronic devices and more than two internal connectors.

Figure 10:
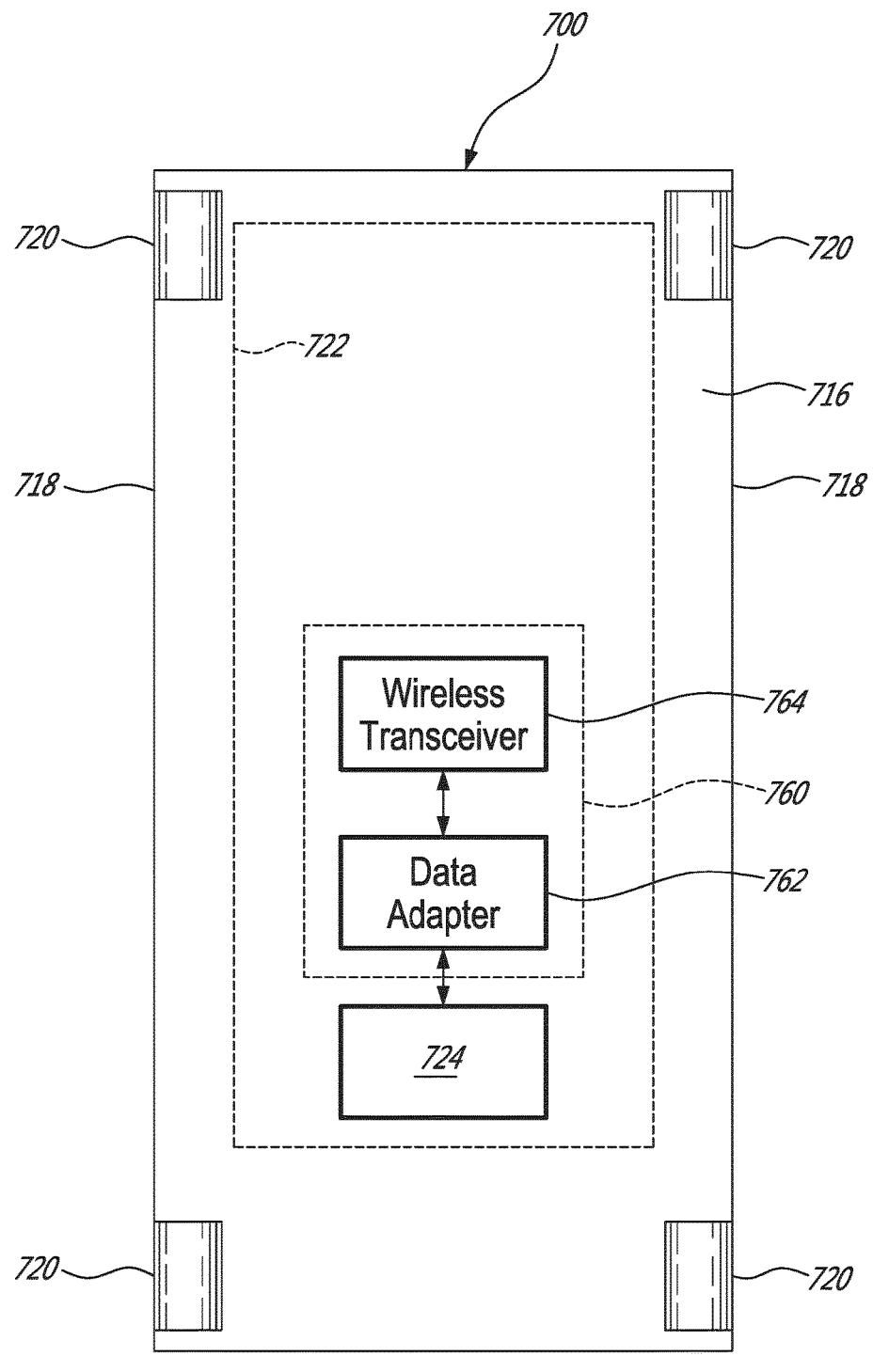
FIG. 10 is a schematic view of an example of an adapter, showing an example of an auxiliary adapter with a data adapter, in accordance with an embodiment.

FIG. 10 shows an example of an adapter 700 for adapting the electronic device 10 to the modular electronic device system 12 including modular electronic devices 14, as described with reference to FIG. 2A. As depicted, the adapter 700 has a housing 716 with two lateral edges 718 and a cavity 722 between the lateral edges 718 of the housing 716. The cavity 722 is adapted to receive the electronic device 10. In this specific example, the two lateral edges 718 of the housing 716 have two magnetic couplers 720 coupleable with magnetic couplers 20 of the modular electronic device system 12. The adapter 700 has an internal connector 724 which is electrically connectable to the electronic device 10 when it is received in the cavity 722 of the housing 716 and an auxiliary adapter 760 connected to the internal connector 724. As can be understood, the auxiliary adapter 760 is configured to adapt communication between the electronic device 10 and one or more modular electronic devices 14 of the modular electronic device system 12. In this specific example, the electronic device 10 is adapted to communicate with one of the modular electronic devices 14 by way of wireless communication via the auxiliary adapter 760.

In this embodiment, the auxiliary adapter 760 includes a data adapter 762 connected to the internal connector 724 and a wireless transceiver 764 connected to the data adapter 762. The data adapter 762 is configured to adapt a data signal between the internal connector 724 and the wireless transceiver 764. For instance, in some embodiments, the data adapter 762 decodes a data signal carried from the internal connector 724, i.e., carried on the data pins of the internal connector 724, and reencodes the data for transmission by the wireless transceiver 764. In some other embodiments, the data adapter 762 receives a data signal and simply encodes it, e.g., by putting a wrapper around it, to make it suitable for transmission. In these embodiments, the step of decoding the data signal can be omitted. During use, the data transmitted by the wireless transceiver 764 can be received by a modular electronic device of the modular electronic device system. The data adapter 762 can also receive a data signal via the wireless transceiver 764. For instance, the data adapter 762 can reencode the data for transmission according to a protocol suitable for internal connector 724 (e.g., USB protocol). To these ends, the data adapter 762 can include a suitable combination of data buffers, data signal modulators, demodulators, filters and/or processors for the encoding and decoding of the data.

In some embodiments, the wireless transceiver 764 is a transceiver that transmits/receives data signals according to inductive coupling effects, e.g., as described in "TransferJet™—Concept and Technology Rev. 1.5" published August 2015 by the TransferJet Consortium. However, the wireless transceiver 764 can also be a Bluetooth transceiver, a near field communication (NFC) transceiver or the like in some other embodiments.

The wireless transceiver 764 can include one or more antennas disposed in the housing 716. For example, as shown in FIG. 11, an antenna 766 can be included in the housing 716 along the lateral edge 718. In this example, the antenna 766 is placed to align with a complementary antenna 66 in the modular electronic device 14 when the adapter 700 and the modular electronic device 14 are coupled to one another by way of magnetic couplers 720 and 20 along that lateral edge 718.

Depending on the embodiment, the auxiliary adapter can also be configured to adapt a power signal between the electronic device 10 and one or more modular electronic devices 14 of the modular electronic device system 12. For instance, FIG. 12 shows an adapter 800 with another example of an auxiliary adapter 860. In this example, the auxiliary adapter 860 is used to transfer a power signal to/from the electronic device 10 received in the cavity of the adapter 800.

As depicted, the auxiliary adapter 860 includes a power adapter 870. The power adapter 870 receives a power signal carried from the internal connector 824, i.e., carried on the power pins of the internal connector 824. The power adapter 870 connects the power signal to one or more electrical connectors of the adapter 800 by way of an internal electrical conductor network 874. One or more modular electronic devices of the modular electronic device system are electrically connectable to the one or more electrical connectors of the adapter 800. In this embodiment, the electrical connectors are embodied by the magnetic couplers 820, however, it is noted that the electrical connectors can be different from the magnetic couplers 820 in some other embodiments. Examples of electrical connectors include USB connectors or any other suitable electrical connectors.

The power adapter 870 can receive a power signal from the magnetic couplers 820 by way of the internal electrical conductor network 874, and connect the power signal to power pins of the internal connector 824. In this way, a data signal is routed to/from internal connector 824 to the wireless transceiver 864 via the data adapter 862, while a power signal is routed to/from internal connector 824 to the magnetic couplers 820 via the internal electrical conductor network 874. The magnetic couplers 820 and internal electrical conductor network 874 can be configured to carry only a power signal, and so fewer contacts/conductors can be used. In some embodiments, the power adapter 870 can adapt the power signal between the magnetic couplers 820 and the internal connector 824. For example, the power adapter 870 can adapt the voltage and/or current of a power signal, adapt its frequency when the power signal is an AC power signal, or adapt an AC power signal to a DC power signal.

FIG. 13 shows an adapter 900 having an auxiliary adapter 960 configured to adapt both wireless communication and wireless power transfer between the electronic device 10 and an adjacent modular electronic device of the modular electronic device system. In this embodiment, the auxiliary adapter 960 has a power adapter 970 configured to adapt a power signal to/from the internal connector 924 through a wireless power transceiver 976.

The wireless power transceiver 976 can include wireless transfer elements such as, e.g., coils used for power transfer, e.g., according to the Qi™ inductive power standard. In some envisaged embodiments, the wireless transfer elements can be included in the housing 916 of the adapter 900 along one or more of the lateral edges 918, and can be placed to be aligned with a complementary wireless transfer element of another modular electronic device of the modular device system when the adapter 900 and the modular electronic device are coupled to one another by way of magnetic couplers along that lateral edge.

As can be understood, the examples described above and illustrated are intended to be exemplary only. For instance, the housing can have a rectangular parallelepiped shape and the lateral edges can be rounded. Each rounded edge can have a complementary semi-cylindrical surface aligned along a length thereof. The housing can have any other suitable shape, depending on the complementary shape of the modular system. The number of magnetic couplers of the adapter is not limited to four, an adapter can have a single one, two, three, or more than four magnetic couplers in alternate embodiments. For instance, two adjacent adapters can be connected to one another provided that one electronic device received in the cavity of a first one of the two adjacent adapters be configurable as a host device, and another electronic device receive in the cavity of a second one of the two adjacent adapters be configured as a slave device. In an alternate embodiment, an adapter has a housing having two lateral edges, a cavity between the lateral edges of the housing and being adapted to receive the electronic device, each of the two lateral edges of the housing having at least one magnetic coupler coupleable with the magnetic couplers of the modular electronic device system. In this embodiment, the electronic device is configured to communicate with any of the modular electronic devices by way of wireless communication (e.g., Bluetooth) while being mechanically coupled to an adjacent one of the modular electronic device by way of magnetic attraction. In a further embodiment, the electric connection provided between the adapter and an adjacent one of the modular electronic device can be wireless using an auxiliary adapter having wireless transceivers. An example of such a wireless communication connector involves an Extremely High Frequency (EHF). One example of an EHF communication connector is described in U.S patent publication no. US 2015/0065069. This would require no physical electrical contacts between the magnetic couplers of the adapter and the magnetic couplers of an adjacent one of the modular electronic devices and yet still allow data communication at satisfactory speed while requiring low power. Still in this embodiment, the housing can have an optional internal connector electrically connectable to an external connector of the electronic device. In this embodiment, the optional internal connector can be wirelessly connected to any adjacent modular electronic device of the modular electronic device system via, for instance, an auxiliary adapter. This wireless connection can be established by a wireless communication system. Examples of wireless communication systems include Bluetooth systems, capacitive connections (very short range), infra-red, RF, EHF, etc. Using this wireless communication system can be advantageous, for instance, there is no need to provide the internal electric conductor network while still allowing data communication at satisfactory speed and requiring low power. As mentioned above, in other embodiments, the internal connector of the adapter can be indirectly connected to the external connector of the electronic device via any suitable auxiliary adapter. In cases where the internal connector is USB-compatible and the external connector is not USB-compatible, the auxiliary adapter can be configured to adapt the data signal to allow compatibility between the internal connector of the adapter and the external connector of the electronic device. The scope is indicated by the appended claims.

What is claimed is:

1. An adapter for adapting an electronic device to a modular electronic device system, wherein modular electronic devices of the modular electronic device system each have a housing with two lateral edges, the lateral edges having at least one magnetic coupler allowing any two of the modular electronic devices to couple to one another by engaging corresponding ones of the magnetic couplers with one another, the adapter comprising:
   a housing having two lateral edges, a cavity between the lateral edges of the housing and being adapted to receive the electronic device, at least one of the two lateral edges of the housing having at least one magnetic coupler coupleable with the magnetic couplers of the modular electronic device system;
   an internal connector being electrically connectable to the electronic device when received in the cavity of the housing; and
   an auxiliary adapter connected to the internal connector, the auxiliary adapter being configured to adapt communication between the electronic device and at least another one of said modular electronic devices of the modular electronic device system, the adapter adapting communication between the electronic device and the other modular electronic device by way of wireless communication, the auxiliary adapter including a data adapter electrically connected to the internal connector and a wireless transceiver electrically connected to the data adapter, the data adapter being configured to adapt a data signal between the internal connector and the wireless transceiver.

2. The adapter of claim 1 wherein the wireless transceiver includes at least one antenna provided along at least one of the two lateral edges of the housing, the at least one antenna being configured to communicate with another antenna in the other modular electronic device when the adapter and the other modular electronic device are coupled to one another.

3. An adapter for adapting an electronic device to a modular electronic device system, wherein modular electronic devices of the modular electronic device system each have a housing with two lateral edges, the lateral edges having at least one magnetic coupler allowing any two of the modular electronic devices to couple to one another by engaging corresponding ones of the magnetic couplers with one another, the adapter comprising:
   a housing having two lateral edges, a cavity between the lateral edges of the housing and being adapted to receive the electronic device, at least one of the two lateral edges of the housing having at least one magnetic coupler coupleable with the magnetic couplers of the modular electronic device system;
   an internal connector being electrically connectable to the electronic device when received in the cavity of the housing; and
   an auxiliary adapter connected to the internal connector, the auxiliary adapter being configured to adapt communication between the electronic device and at least another one of said modular electronic devices of the modular electronic device system, the auxiliary adapter including a power adapter electrically connected to the internal connector and configured to route power between the electronic device and the other modular electronic device of the modular electronic device system.

4. The adapter of claim 3 wherein the auxiliary adapter includes an internal electrical conductor network inside the housing and connected between the power adapter and at least one electrical connector of the adapter, the other modular electronic device being connectable to the at least one electrical connector of the adapter.

5. The adapter of claim 4 wherein the at least one electrical connector of the adapter corresponds to the at least one magnetic coupler of the adapter.

6. The adapter of claim 3 wherein the auxiliary adapter includes a wireless power transceiver electrically connected to the power adapter for wirelessly power transfer between the power adapter and at least one electrical connector of the adapter.

7. An adapter comprising:
   a housing having two lateral edges, a cavity between the lateral edges of the housing and being adapted to receive an electronic device, at least one of the two lateral edges of the housing having at least one magnetic coupler coupleable with at least one magnetic coupler of a modular electronic device;
   an internal connector being electrically connectable to the electronic device when received in the cavity of the housing; and
   an auxiliary adapter connected to the internal connector, the auxiliary adapter being configured to adapt communication between the electronic device and the modular electronic device, the adapter adapting communication between the electronic device and the modular electronic device by way of wireless communication, the auxiliary adapter including a data adapter electrically connected to the internal connector and a wireless transceiver electrically connected to the data adapter, the data adapter being configured to adapt a data signal between the internal connector and the wireless transceiver.

8. The adapter of claim 7 wherein the wireless transceiver includes at least one antenna provided along at least one of the two lateral edges of the housing, the at least one antenna being configured to communicate with another antenna in the modular electronic device when the adapter and the modular electronic device are coupled to one another.

9. An adapter comprising:
a housing having two lateral edges, a cavity between the lateral edges of the housing and being adapted to receive an electronic device, at least one of the two lateral edges of the housing having at least one magnetic coupler coupleable with at least one magnetic coupler of a modular electronic device;
an internal connector being electrically connectable to the electronic device when received in the cavity of the housing; and
an auxiliary adapter connected to the internal connector, the auxiliary adapter being configured to adapt communication between the electronic device and the modular electronic device, the auxiliary adapter including a power adapter electrically connected to the internal connector and configured to route power between the electronic device and the modular electronic device of the modular electronic device system.

10. The adapter of claim 9 wherein the auxiliary adapter includes an internal electrical conductor network inside the housing and connected between the power adapter and at least one electrical connector of the adapter, the modular electronic device being connectable to the at least one electrical connector of the adapter.

11. The adapter of claim 10 wherein the at least one electrical connector of the adapter corresponds to the at least one magnetic coupler of the adapter.

12. The adapter of claim 9 wherein the auxiliary adapter includes a wireless power transceiver electrically connected to the power adapter for wirelessly power transfer between the power adapter and at least one electrical connector of the adapter.

* * * * *